(12) United States Patent
Kondo et al.

(10) Patent No.: US 8,597,726 B2
(45) Date of Patent: Dec. 3, 2013

(54) HARDCOAT LAMINATE

(75) Inventors: Shunichi Kondo, Kanagawa (JP); Hiroyuki Yoneyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/452,211

(22) Filed: Apr. 20, 2012

(65) Prior Publication Data

US 2012/0208038 A1   Aug. 16, 2012

Related U.S. Application Data

(62) Division of application No. 12/270,593, filed on Nov. 13, 2008, now abandoned.

(30) Foreign Application Priority Data

Nov. 20, 2007   (JP) .................. P2007-300309

(51) Int. Cl.
*B05D 5/06* (2006.01)

(52) U.S. Cl.
USPC .......................................... 427/162; 427/164

(58) Field of Classification Search
USPC ................................. 427/162, 164
See application file for complete search history.

(56) References Cited

U.S. PATENT DOCUMENTS

| | | | |
|---|---|---|---|
| 4,120,721 A * | 10/1978 | Ketley et al. | 430/284.1 |
| 5,609,990 A * | 3/1997 | Ha et al. | 430/270.11 |
| 6,187,835 B1 | 2/2001 | Szum et al. | |
| 2007/0247711 A1* | 10/2007 | Ohtani et al. | 359/485 |
| 2009/0137743 A1* | 5/2009 | Ito et al. | 525/223 |

FOREIGN PATENT DOCUMENTS

| | | | |
|---|---|---|---|
| JP | 9-111151 A | | 4/1997 |
| JP | 2000-84477 A | | 3/2000 |
| JP | 2004-70296 A | | 3/2004 |
| JP | 2004-244564 A | | 9/2004 |
| JP | 2005-325343 A | | 11/2005 |
| JP | 2005325343 | * | 11/2005 |
| JP | 2006-171464 A | | 6/2006 |
| WO | WO 2006/025445 A1 | | 3/2006 |
| WO | WO 2006025445 | * | 3/2006 |
| WO | WO 2006/036489 A1 | | 4/2006 |

OTHER PUBLICATIONS

Final Office Action dated Dec. 23, 2011 issued in U.S. Appl. No. 12/270,593.
Information Disclosure Statement filed in Japanese Application No. 2007-300309 submitted on Apr. 27, 2011, including an English translation.
Non-Final Office Action dated Apr. 28, 2011 issued in U.S. Appl. No. 12/270,593.
Office Action in Japanese Application No. 2007-300309 mailed May 31, 2011.
Japanese Office Action issued on Oct. 9, 2012 in corresponding Japanese patent application No. 2007-300309 (Partial English translation is attached).
Japanese Office Action issued Jan. 15, 2013 in Japanese application No. 2007-300309 (Partial English translation is attached).

* cited by examiner

*Primary Examiner* — Elizabeth Burkhart
(74) *Attorney, Agent, or Firm* — Birch, Stewart, Kolasch & Birch, LLP

(57) ABSTRACT

A hardcoat laminate including: a support formed from a thermoplastic resin composition; and a hardcoat layer formed from a hardcoat layer forming coating composition, wherein the thermoplastic resin composition contains a polymer having a lactone ring unit or a glutaric anhydride unit, and the hardcoat layer forming coating composition contains at least a component (a), a component (b) and a component (c) and contains substantially no organic solvent: (a) a curable compound having three or more polymerizable groups within one molecule, (b) a polymerization initiator, and (c) a diluent having from one to three polymerizable groups within one molecule.

12 Claims, No Drawings

HARDCOAT LAMINATE

This application is a divisional of U.S. patent application Ser. No. 12/270,593, filed Nov. 13, 2008, now abandoned, and for which priority is claimed under 35U.S.C. §120; and this application claims priority of Application No. P2007-300309, filed in Japan on Nov. 20, 2007, under 35 U.S.C. §119; the entire contents of all are hereby incorporated by reference.

BACKGROUND OF THE INVENTION

1. Field of the Invention

The present invention relates to a hardcoat laminate in which a hardcoat layer formed from a hardcoat layer-forming coating composition mainly comprising a polymerizable compound, a polymerization initiator and a diluent is stacked on a support formed from a thermoplastic resin composition containing a lactone ring unit or a glutaric anhydride unit.

2. Description of the Related Art

In recent years, a flat panel display as typified by liquid crystal display, PDP, organic EL and the like comes into widespread use in place of a Braun tube, and this is accompanied by diversification of the environment in which the display is installed. Also, in the case of a display used for a mobile device such as cellular phone or Palm, the use environment is becoming severer.

A triacetyl cellulose film is easy of processing as a protective film for a polarizing plate and therefore, being widely used as an optical film for a liquid crystal display but is disadvantageous in that the moisture permeability is high and when stored in a high-temperature high-humidity condition, the polarizing plate is liable to change in the performance. Above all, in application to a cellular phone, the optical film is sometimes exposed to a high-humidity environment due to rain on outing, human sweat or the like.

As regards a high-transparency support with little change in performance even under a high-temperature high-humidity environment, it is disclosed to use a film of a thermoplastic resin containing a lactone ring-containing polymer (JP-A-2006-171464 (the term "JP-A" as used herein means an "unexamined published Japanese patent application")) or use a film of a polymer having a glutaric anhydride unit (JP-A-2004-070296). The film of such a thermoplastic resin has succeeded in reaching a certain performance level in terms of little change in performance under a high-temperature high-humidity condition, but in the case of using this film alone on the display surface, the surface hardness is insufficient. In order to increase the hardness of the film, it is conventionally known to provide a hardcoat layer. For example, in a patent publication of a lactone ring-containing support (International Publication No. 2006/025445, pamphlet), a hardcoat diluted with an organic solvent is described.

SUMMARY OF THE INVENTION

However, when a coating solution having a generally employed hardcoat layer-forming composition obtained by diluting a reactive monomer with an organic solvent is coated on such a film and cured, it is found that the film is altered by the organic solvent and the transparency of the film is partially decreased.

Also, when the above-described hardcoat layer-forming composition using an organic solvent is coated on a support formed from a thermoplastic resin composition containing a polymer having a lactone ring unit or a glutaric anhydride unit and cured, the hardness of the hardcoat layer itself is satisfied, but significant curling ascribable to volume contraction occurs.

Accordingly, an aspect of the present invention is to provide a hardcoat laminate obtained by forming a hardcoat layer on a support formed from a thermoplastic composition containing a polymer having a lactone ring unit or a glutaric anhydride unit, where the hardcoat laminate can maintain high transparency even in a circumstance subject to various environmental changes and further, is assured of high surface hardness and low curling.

In order to solve those problems, the present inventors have made studies on a specific effective formulation for a hardcoat layer with respect to a support formed from a thermoplastic composition containing a lactone ring unit or a glutaric anhydride unit, as a result, it has been found that when a coating composition having a specific formulation is employed, a good hardcoat layer can be formed without using an organic solvent that adversely affects the support and the above-described object can be attained. The present invention has been accomplished based on this finding.

That is, the present invention is as follows:

(1) A hardcoat laminate comprising:

a support formed from a thermoplastic resin composition; and a hardcoat layer formed from a hardcoat layer forming coating composition, wherein the thermoplastic resin composition contains a polymer having a lactone ring unit or a glutaric anhydride unit, and the hardcoat layer forming coating composition contains at least a component (a), a component (b) and a component (c) and contains substantially no organic solvent:

(a) a curable compound having three or more polymerizable groups within one molecule, (b) a polymerization initiator, and (c) a diluent having from one to three polymerizable groups within one molecule.

(2) The hardcoat laminate as described in item (1), wherein the polymerizable groups in the component (a) are acryloyl groups or methacryloyl groups and the polymerizable groups in the component (c) are acryloyl groups or methacryloyl groups.

(3) The hardcoat laminate as described in items (1) or (2), wherein the diluent of the component (c) has two (meth) acryloyl groups within one molecule.

(4) The hardcoat laminate as described in any of items (1) to (3), wherein the polymer having a lactone ring unit has a unit represented by the following formula (1):

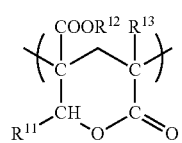

wherein $R^{11}$, $R^{12}$ and $R^{13}$ each independently represents a hydrogen atom or an organic residue having 1 to 20 carbon atoms, and the organic residue may contain an oxygen atom.

(5) The hardcoat laminate as described in any of item (1) to (4), wherein the polymer having a glutaric anhydride unit has a unit represented by the following formula (3):

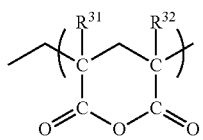

wherein $R^{31}$ and $R^{32}$ each independently represents a hydrogen atom or an organic residue having 1 to 20 carbon atoms, and the organic residue may contain an oxygen atom.

(6) The hardcoat laminate as described in any of item (1) to (5), wherein the thermoplastic resin composition further contains a copolymer having a vinyl cyanide-based monomer unit and an aromatic vinyl-based monomer unit.

DETAILED DESCRIPTION OF THE INVENTION

The contents of the present invention are described in detail below. Incidentally, the term "from (numerical value) to (numerical value)" as used in the context of the present invention includes the numerical values before and after "to" as the lower limit and the upper limit. Also, in the context of the present invention, unless otherwise indicated, the "group" such as alkyl group may or may not have a substituent. Furthermore, when the number of carbon atoms in the group is limited, the number of carbon atoms indicates a number of carbon atoms including the carbon atoms possessed by the substituent.

(Hardcoat Laminate)

The hardcoat laminate of the present invention (hereinafter sometimes referred to as a "laminate of the present invention") is described below.

The hardcoat laminate of the present invention is a hardcoat laminate having a hardcoat layer formed from a hardcoat layer-forming coating composition on a support formed from a thermoplastic resin composition, wherein the thermoplastic resin composition contains a polymer having a lactone ring unit or a glutaric anhydride unit and the hardcoat layer-forming coating composition contains the following components (a), (b) and (c):

(a) a curable compound having three or more polymerizable groups within one molecule, (b) a polymerization initiator, and (c) a diluents having from one to three polymerizable groups within one molecule.

In the present invention, a hardcoat layer formed from a hardcoat layer-forming coating composition is provided on a support formed from a thermoplastic resin composition. By virtue of such a hardcoat layer, even when the support alone has a pencil hardness (JIS K6894) of HB or less, the hardcoat laminate can have a pencil hardness of 3H or more.

1. Support Formed from Thermoplastic Resin Composition

In the present invention, the thermoplastic resin composition used for the support contains a polymer having a lactone ring unit or a glutaric anhydride unit in the main or side chain (hereinafter, this polymer is referred to as a "component (A)"), as a thermoplastic resin. By having such a ring structure in the polymer, an optical film having high glass transition temperature and high heat resistance can be obtained. Preferred embodiments of each component are described below.

1-1. Polymer Having Lactone Ring Unit (Lactone Ring-Containing Polymer)

A first embodiment of the preferred support for use in the present invention is a support formed from a thermoplastic resin composition containing a lactone ring-containing polymer as a thermoplastic resin. The lactone ring-containing polymer is not particularly limited as long as the polymer has a lactone ring, but the polymer preferably has a lactone ring structure represented by the following formula (1):

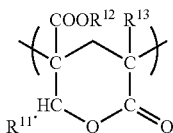

In formula (1), $R^{11}$, $R^{12}$ and $R^{13}$ each independently represents a hydrogen atom or an organic residue having 1 to 20 carbon atoms, and the organic residue may contain an oxygen atom. The organic residue having 1 to 20 carbon atoms is preferably, for example, a methyl group, an ethyl group, an isopropyl group, an n-butyl group or a tert-butyl group.

The proportion of the lactone ring structure represented by formula (1) contained in the structure of the lactone ring-containing polymer is preferably from 5 to 90 mass %, more preferably from 10 to 70 mass %, still more preferably from 10 to 60 mass %, yet still more preferably from 10 to 50 mass %, based on the entire polymer. When the proportion of the lactone structure contained is 5 mass % or more, the heat resistance and surface hardness of the obtained polymer are liable to be enhanced, and when the proportion of the lactone ring structure contained is 90 mass % or less, the forming processability of the obtained polymer tends to be enhanced.

The lactone ring-containing polymer may have a structure other than the lactone ring structure represented by formula (1). The structure other than the lactone ring structure represented by formula (1) is preferably, for example, a polymer structural unit (repeating structural unit) formed by polymerizing at least one monomer selected from the group consisting of an (meth)acrylic acid ester, a hydroxy group-containing monomer, an unsaturated carboxylic acid and a monomer represented by the following formula (2), which is described later regarding the production method of a lactone ring-containing polymer.

$$CH_2=C(R^{21})-X \qquad (2)$$

In formula (2), $R^{21}$ represents a hydrogen atom or a methyl group, X represents a hydrogen atom, an alkyl group having 1 to 20 carbon atoms, an aryl group, an —OAc group, a —CN group or a —CO—$R^{22}$ group, Ac represents an acetyl group, and $R^{22}$ represents a hydrogen atom or an organic residue having 1 to 20 carbon atoms. X is preferably a methyl group, an ethyl group, a propyl group, an isopropyl group, an n-butyl group, an isobutyl group, a tert-butyl group, a cyclohexyl group, a benzyl group or the like.

The proportion of the structure other than the lactone ring structure represented by formula (1), contained in the structure of the lactone ring-containing polymer is, in the case of a polymer structural unit (repeating structural unit) formed by polymerizing a (meth)acrylic acid ester, preferably from 10 to 95 mass %, more preferably from 10 to 90 mass %, still more preferably from 30 to 90 mass %, yet still more preferably from 40 to 90 mass %, even yet still more preferably from 50 to 90 mass %; in the case of a polymer structural unit (repeating structural unit) formed by polymerizing a hydroxy group-containing monomer, preferably from 0 to 30 mass %, more preferably from 0 to 20 mass %, still more preferably from 0 to 15 mass %, yet still more preferably from 0 to 10 mass %; in the case of a polymer structural unit (repeating structural unit) formed by polymerizing an unsaturated carboxylic acid, preferably from 0 to 30 mass %, more preferably from 0 to 20 mass %, still more preferably from 0 to 15 mass %, yet still more preferably from 0 to 10 mass %; and in the case of a polymer structural unit (repeating structural unit) formed by polymerizing a monomer represented by formula (2), preferably from 0 to 30 mass %, more preferably from 0 to 20 mass %, still more preferably from 0 to 15 mass %, yet still more preferably from 0 to 10 mass %.

The production method of the lactone ring-containing polymer is not particularly limited, but the polymer is preferably produced by obtaining a polymer (p) having a hydroxyl group and an ester group in the molecular chain by a polymerization process and then performing a lactone cyclizing condensation reaction by heat-treating of the obtained polymer (p) and thereby introducing a lactone ring structure into the polymer.

More specifically, it is preferred to obtain a polymer having a hydroxyl group and an ester group in the molecular chain by performing a polymerization reaction of monomer components containing a monomer represented by the following formula (1p) and then perform a cyclizing condensation ration of the obtained polymer.

(1p)

In the formula, $R^{14}$ and $R^{15}$ each independently represents a hydrogen atom or an organic residue having 1 to 20 carbon atoms, and the organic residue may contain an oxygen atom.

Examples of the monomer represented by formula (1p) include methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and tert-butyl 2-(hydroxymethyl)acrylate. Among these, methyl 2-(hydroxymethyl)acrylate and ethyl 2-(hydroxymethyl)acrylate are preferred, and in view of a high effect of enhancing heat resistance, methyl 2-(hydroxymethyl)acrylate is more preferred. One of the monomers represented by formula (1p) may be used alone, or two or more thereof may be used in combination.

The proportion of the monomer represented by formula (1p) is preferably from 5 to 90 mass %, more preferably from 10 to 70 mass %, still more preferably from 10 to 60 mass %, yet still more preferably from 10 to 50 mass %, based on the monomer components used in the polymerization process. If the proportion of the monomer represented by formula (1p) is less than 5 mass % based on the monomer components used in the polymerization process, the heat resistance and surface hardness may be insufficient and this is not preferred, whereas if the proportion of the monomer represented by formula (1p) exceeds 90 mass % based on the monomer components used in the polymerization process, this is disadvantageous in that gelling may occur during polymerization or lactone cyclization or the obtained polymer may suffer from poor forming processability.

In the monomer components used in the polymerization process, a monomer other than the monomer represented by formula (1p) may be contained. This monomer is not particularly limited, but preferred examples thereof include a (meth)acrylic acid ester, a hydroxyl group-containing monomer, an unsaturated carbonic acid, and a monomer represented by formula (2). One of the monomers other than the monomer represented by formula (1p) may be used alone, or two or more thereof may be used in combination.

The (meth)acrylic acid ester is not particularly limited as long as it is a (meth)acrylic acid ester other than the monomer represented by formula (1p), but examples thereof include an acrylic acid ester such as methyl acrylate, ethyl acrylate, n-butyl acrylate, isobutyl acrylate, tert-butyl acrylate, cyclohexyl acrylate and benzyl acrylate; and a methacrylic acid ester such as methyl methacrylate, ethyl methacrylate, propyl methacrylate, n-butyl methacrylate, isobutyl methacrylate, tert-butyl methacrylate, cyclohexyl methacrylate and benzyl methacrylate. One of these (meth)acrylic acid esters may be used alone, or two or more thereof may be used in combination. Among these, methyl methacrylate is preferred because this is excellent in the heat resistance and transparency.

Subsequently, a cyclizing condensation reaction is performed.

In performing the cyclizing condensation reaction, other thermoplastic resins may be present together, in addition to the polymer (p). Also, in performing the cyclizing condensation reaction, if desired, a generally employed esterification catalyst or transesterification catalyst, such as p-toluenesulfonic acid, or an organic carboxylic acid such as acetic acid, propionic acid, benzoic acid, acrylic acid and methacrylic acid, may be used as a catalyst of the cyclizing condensation reaction. As described in JP-A-61-254608 and JP-A-61-261303, it may be possible to use a basic compound, an organic carboxylate, a carbonate or the like.

In performing the cyclizing condensation reaction, as described in JP-A-2001-151814, an organic phosphorus compound may also be used as a catalyst.

By using an organic phosphorus compound as a catalyst, not only the cyclizing condensation reaction rate can be enhanced but also coloration of the obtained lactone ring-containing polymer can be greatly reduced. Furthermore, use of an organic phosphorus compound as a catalyst enables suppressing reduction in the molecular weight, which may occur when a devolatizing step described later is used in combination, and imparting excellent mechanical strength.

It is preferred that the cyclizing condensation reaction is performed in the presence of a solvent and a devolatizing step is used in combination at the cyclizing condensation reaction. In this case, there is an embodiment where the devolatizing step is used in combination throughout the cyclizing condensation reaction, and an embodiment where the devolatizing step is not used in combination throughout the process of the cyclizing condensation reaction but used in combination only in a part of the process. In the method using a devolatizing step in combination, an alcohol produced as a by-product in the condensation cyclizing reaction is forcedly removed by volatilization and therefore, the reaction equilibrium becomes advantageous to the production side.

The devolatizing step indicates a step where a volatile content such as solvent and residual monomer as well as an alcohol produced as a by-product in the cyclizing condensation reaction of introducing a lactone ring structure are removed, if desired, preferably under reduced pressure of 1.33 to 931 hPa and preferably under heating at 150 to 300° C. If this removing treatment is insufficient, the residual volatile content increases in the resin produced, giving rise to a problem such as coloration due to alteration or the like at the molding or occurrence of a molding failure described later, such as bubble or silver streak.

The mass average molecular weight of the lactone ring-containing polymer is preferably from 1,000 to 2,000,000, more preferably from 5,000 to 1,000,000, still more preferably from 10,000 to 500,000, yet still more preferably from 50,000 to 500,000.

In the lactone ring-containing polymer, the mass decrease rate in the temperature range of 150 to 300° C. as determined by the dynamic TG measurement is preferably 1% or less, more preferably 0.5% or less, still more preferably 0.3% or less. As for the method of dynamic TG measurement, the method described in JP-A-2002-138106 can be used.

In the case where the cyclizing condensation reaction rate of the lactone ring-containing polymer is high and the lactone ring structure occupies 90 mass % or more of the entire polymer, a dealcoholization reaction less occurs in the production process of a molded article and a trouble such as formation of a bubble or a silver streak in the molded article after molding, that is ascribable to the alcohol, can be avoided. Furthermore, when the lactone ring structure is introduced in a proportion of 5 mass % or more based on the entire polymer by virtue of a high cyclizing condensation reaction rate, the obtained lactone ring-containing polymer has high heat resistance.

The coloration degree (YI) when forming the lactone ring-containing polymer into a chloroform solution in a concentration of 15 mass % is preferably 6 or less, more preferably 3 or less, still more preferably 2 or less, yet still more preferably 1 or less. When the coloration degree (YI) is 6 or less, a trouble such as impairment of transparency by coloration scarcely occurs and the polymer can be suitably used in the present invention.

The 5% mass decrease temperature of the lactone ring-containing polymer as measured by the thermogravimetry (TG) is preferably 330° C. or more, more preferably 350° C. or more, still more preferably 360° C. or more. The 5% mass decrease temperature by the thermogravimetry (TG) is indicative of thermal stability and when this is 330° C. or more, sufficient thermal stability tends to be exerted. The thermogravimetry may be performed using the apparatus in the dynamic TG measurement above.

The glass transition temperature (Tg) of the lactone ring-containing polymer is preferably 115° C. or more, more preferably 125° C. or more, still more preferably 130° C. or more, yet still more preferably 135° C. or more, and most preferably 140° C. or more.

The total amount of residual volatile matters contained in the lactone ring-containing polymer is preferably 5,000 ppm or less, more preferably 2,000 ppm or less, still more preferably 1,500 ppm or less, yet still more preferably 1,000 ppm or less. When the total amount of residual volatile matters is 5,000 ppm or less, coloration due to alteration or the like at the molding or occurrence of a molding failure such as bubbling or silver streak is suppressed and this is preferred.

The total light transmittance of the lactone ring-containing polymer as measured by the method according to ASTM-D-1003 for a molded article obtained by injection molding is preferably 85% or more, more preferably 88% or more, still more preferably 90% or more. The total light transmittance is indicative of the transparency and when the total light transmittance is 85% or more, the transparency tends to be enhanced.

The lactone ring-containing polymer satisfying these physical properties includes, particularly, a copolymer having the following structure and in this case, the lactone ring content is preferably from 5 to 90 mass %.

Preferred examples of the structure of the copolymer include, but are not limited to, a methacrylic acid, a hydroxy group-containing monomer, an unsaturated carboxylic acid, an acrylonitrile, an unsaturated carboxylic acid ester, and an aryl group-containing monomer.

1-2. Polymer Having Glutaric Anhydride Unit

A second embodiment of the preferred support for use in the present invention is a support formed from a polymer having a glutaric anhydride unit.

The polymer having a glutaric anhydride unit preferably has a glutaric anhydride unit represented by the following formula (3) (hereinafter referred to as a "glutaric anhydride unit").

(3)

In formula (3), $R^{31}$ and $R^{32}$ each independently represents a hydrogen atom or an organic residue having 1 to 20 carbon atoms, and the organic residue may contain an oxygen atom. In particular, $R^{31}$ and $R^{32}$, which may be the same or different, each preferably represents a hydrogen atom or an alkyl group having 1 to 5 carbon atoms.

The polymer having a glutaric anhydride unit is preferably an acrylic thermoplastic copolymer containing a glutaric anhydride unit and an acrylic copolymerization unit. The acrylic thermoplastic copolymer preferably has a glass transition temperature (Tg) of 120° C. or more in view of heat resistance.

The content of the glutaric anhydride unit is preferably from 5 to 50 mass %, more preferably from 10 to 45 mass %, based on the acrylic thermoplastic copolymer. When the content is 5 mass % or more, preferably 10 mass % or more, an effect of enhancing heat resistance can be obtained and furthermore, an effect of enhancing weather resistance may also be obtained.

The acrylic copolymerization unit contained together with the glutaric anhydride unit in the acrylic thermoplastic copolymer includes an unsaturated carboxylic acid alkyl ester unit based on an unsaturated carboxylic acid alkyl ester. Examples of the unsaturated carboxylic acid alkyl ester-based unit include a repeating unit represented by the following formula (4):

—[CH$_2$—C(R$^{41}$)(COOR$^{42}$)]—  (4)

In formula (4), $R^{41}$ represents hydrogen or an alkyl group having 1 to 5 carbon atoms, and $R^{42}$ represents an aliphatic or alicyclic hydrocarbon group having 1 to 6 carbon atoms, or an aliphatic or alicyclic hydrocarbon group having 1 to 6 carbon atoms and substituted by a hydroxyl group having 1 or less carbon atom or a halogen.

The monomer corresponding to the repeating unit represented by formula (4) is represented by the following formula (5):

CH$_2$=C(R$^{41}$)(COOR$^{42}$)  (5)

Specific preferred examples of such a monomer include a methyl (meth)acrylate, an ethyl (meth)acrylate, an n-propyl (meth)acrylate, an n-butyl (meth)acrylate, a tert-butyl (meth)acrylate, an n-hexyl(meth)acrylate, a cyclohexyl(meth)acrylate, a chloromethyl (meth)acrylate, a 2-chloroethyl(meth)acrylate, a 2-hydroxyethyl(meth)acrylate, a 3-hydroxypropyl (meth)acrylate, a 2,3,4,5,6-pentahydroxyhexyl(meth) acrylate, and 2,3,4,5-tetrahydroxypentyl(meth)acrylate. Above all, methyl methacrylate is most preferably used. One of these monomers may be used alone, or two or more thereof may be used in combination.

The content of the unsaturated carboxylic acid alkyl ester-based unit is preferably from 50 to 95 mass %, more preferably from 55 to 90 mass %, based on the acrylic thermoplastic copolymer. The acrylic thermoplastic copolymer having a glutaric anhydride unit and an unsaturated carboxylic acid alkyl ester-based unit can be obtained, for example, by the cyclizing polymerization of a copolymer having an unsaturated carboxylic acid alkyl eater-based unit and an unsaturated carboxylic acid unit.

The unsaturated carboxylic acid unit is, for example, preferably an unsaturated carboxylic acid unit represented by the following formula (6):

wherein $R^{51}$ represents hydrogen or an alkyl group having 1 to 5 carbon atoms.

Specific preferred examples of the monomer from which the unsaturated carboxylic acid unit is derived include a compound represented by the following formula (7), that corresponds to the repeating unit represented by formula (6), a maleic acid, and a hydrolysate of malic anhydride. Among these, a compound represented by the following formula (7) is more preferred because of excellent thermal stability, an acrylic acid and a methacrylic acid are still more preferred, and a methacrylic acid is yet still more preferred. Formula (7):

One of these monomers may be used alone, or two or more thereof may be used in combination. As described above, the acrylic thermoplastic copolymer having a glutaric anhydride unit and an unsaturated carboxylic acid alkyl ester-based unit can be obtained, for example, by the cyclizing polymerization of a copolymer having an unsaturated carboxylic acid alkyl ester-based unit and an unsaturated carboxylic acid unit and therefore, may have an unsaturated carboxylic acid unit that remains in the constituent units.

The content of the unsaturated carboxylic acid unit is preferably 10 mass % or less, more preferably 5 mass % or less, based on the acrylic thermoplastic copolymer. By setting the content to be 10 mass % or less, reduction in the colorless transparency and residence stability can be prevented.

The acrylic thermoplastic copolymer may have aromatic ring-free other vinyl-based monomer units within the range not impairing the effects of the present invention. Specific examples of the aromatic ring-free other vinyl-based monomer unit include, in terms of the corresponding monomer, a vinyl cyanide-based monomer such as acrylonitrile, methacrylonitrile and ethacrylonitrile; an allyl glycidyl ether; maleic anhydride and itaconic anhydride; N-methylmaleimide, N-ethylmaleimide, N-cyclohexylmaleimide, acrylamide, methacrylamide, N-methylacrylamide, butoxymethylacrylamide and N-propylmethacrylamide; aminoethyl acrylate, propylaminoethyl acrylate, dimethylaminoethyl methacrylate, ethylaminopropyl methacrylate, and cyclohexylaminoethyl methacrylate; N-vinyldiethylamine, N-acetylvinylamine, allylamine, methallylamine, and N-methylallylamine; 2-isopropenyl-oxazoline, 2-vinyl-oxazoline, and 2-acroyl-oxazoline. One of these monomers may be used alone, or two or more thereof may be used in combination.

The content of the aromatic ring-free other vinyl-based monomer unit in the acrylic thermoplastic copolymer is preferably 35 mass % or less based on the entire acrylic thermoplastic copolymer.

Incidentally, the aromatic ring-containing vinyl-based monomer unit (e.g., N-phenylmaleimide, phenylaminoethyl methacrylate, p-glycidylstyrene, p-aminostyrene, 2-styryl-oxazoline) has a tendency to decrease the scratch resistance and weather resistance and therefore, its content in the acrylic thermoplastic copolymer is preferably 1 mass % or less based on the entire copolymer.

1-3. (B) Another Thermoplastic Resin Usable in Combination with Thermoplastic Resin as Component (A)

In the present invention, the thermoplastic resin composition used for the support may further contain (B) another thermoplastic resin, in addition to the component (A). In the present invention, the thermoplastic resin (B) is preferably a thermoplastic resin having a performance such that the glass transition temperature is 100° C. or more and the total light transmittance is 85% or more, because when mixed with the component (A) for use in the present invention and formed into a film, the heat resistance or mechanical strength is enhanced.

The ratio of the component (A) to the another thermoplastic resin (B) component contained in the thermoplastic composition is, in terms of the mass ratio of $[(A)/\{(A)+(B)\}] \times 100$, preferably from 60 to 99 mass %, more preferably from 70 to 97 mass %, still more preferably from 80 to 95 mass %. If the proportion of the ring-containing polymer contained in the support is less than 60 mass %, the heat resistance may not be sufficiently brought out. By using the component (B), the phase difference can be adjusted.

Examples of the another thermoplastic resin (B) include an olefin-based polymer such as polyethylene, polypropylene, ethylene-propylene copolymer and poly(4-methyl-1-pentene); a halogen-containing polymer such as vinyl chloride or chlorinated vinyl resin; an acrylic polymer such as polymethyl methacrylate; a styrene-based polymer such as polystyrene, styrene-methyl methacrylate copolymer, styrene-acrylonitrile copolymer and acrylonitrile-butadiene-styrene block copolymer; a polyester such as polyethylene terephthalate, polybutylene terephthalate and polyethylene naphthalate; a polyamide such as nylon 6, nylon 66 and nylon 610; a polyacetal; a polycarbonate; a polyphenylene oxide; a polyphenylene sulfide; a polyether ether ketone; a polysulfone; a polyoxybenzylene; a polyamideimide; and a rubbery polymer such as ABS or ASA resin having blended therein polybutadiene-based rubber or acrylic rubber. The rubbery polymer preferably has, on its surface, a graft moiety having a composition compatible with the ring polymer for use in the present invention, and the average particle diameter of the rubbery polymer is preferably 100 nm or less, more preferably 70 nm or less, in view of enhancing the transparency when formed into a film.

As for the another thermoplastic resin (B), a resin that is thermodynamically compatibilized with the component (A) is preferably used. Preferred examples of this another thermoplastic resin (B) include an acrylonitrile-styrene-based copolymer having a vinyl cyanide-based monomer unit and an aromatic vinyl-based monomer unit, a polyvinyl chloride resin, and a polymer containing 50 mass % or more of methacrylic acid esters. Among these, an acrylonitrile-styrene-based copolymer is preferred, because an optical film having a glass transition temperature of 120° C. or more, in which the phase difference per 100 μm in the plane direction is 20 nm or less and the total light transmittance is 85% or more, can be easily obtained.

As for the acrylonitrile-styrene-based copolymer, specifically, a copolymer where the copolymerization ratio in terms of molar unit is from 1:10 to 10:1 is useful.

Incidentally, whether the component (A) and another thermoplastic resin (B) are thermodynamically compatibilized can be confirmed by measuring the glass transition temperature of a thermoplastic resin composition obtained by these components. More specifically, when the glass transition point measured by a differential scanning calorimeter for a mixture of the component (A) and the another thermoplastic resin (B) is observed only at one point, these components can be said to be thermodynamically compatibilized.

In the case of using an acrylonitrile-styrene-based copolymer as the another thermoplastic resin (B), examples of the production method thereof include an emulsion polymerization method, a suspension polymerization method, a solution polymerization method and a bulk polymerization method, but in view of transparency or optical performance of the optical film obtained, a copolymer produced by a solution polymerization method or a bulk polymerization method is preferred.

1-4. Additive

In the present invention, an additive may be further added to the thermoplastic resin composition. Examples of the additive include an antioxidant such as hindered phenol type, phosphorus type and sulfur type; a stabilizer such as light-resistant stabilizer, weather-resistant stabilizer and thermal stabilizer; a reinforcement such as glass fiber and carbon fiber; an ultraviolet absorbent such as phenyl salicylate, (2,2'-hydroxy-5-methylphenyl)benzotriazole and 2-hydroxybenzophenone; a near infrared absorbent; a flame retardant such as tris(dibromopropyl) phosphate, triallyl phosphate and antimony oxide; an antistatic agent such as anionic, cationic or nonionic surfactant; a colorant such as inorganic pigment, organic pigment and dye; an organic or inorganic filler; a resin modifier; an organic or inorganic filler; a plasticizer; a lubricant; an antistatic agent; and a flame retardant.

In the case of using an additive, the proportion of the additive contained in the thermoplastic resin composition is preferably from 0 to 5 mass %, more preferably from 0 to 2 mass %, still more preferably from 0 to 0.5 mass %, based on the entire composition.

2. Production Method of Support

The production method of the support for use in the present invention is not particularly limited, but the support can be obtained, for example, by mixing the component (A) with, if desired, the component (B), the additives and the like by a known mixing method and forming the mixture into a film. Also, the film may be stretched to obtain a stretched film.

As for the film forming method, a conventionally known film forming method may be used, and examples thereof include a solution cast method (solution casting method), a melt extrusion method, a calendering method, and a compression molding method. Among these film forming methods, a solution cast method (solution casting method) and a melt extrusion method are preferred.

Examples of the solvent used in the solution cast method (solution casting method) include a chlorine-based solvent such as chloroform and dichloromethane; an aromatic solvent such as toluene, xylene and benzene; an alcohol-based solvent such as methanol, ethanol, isopropanol, n-butanol and 2-butanol; methyl cellosolve, ethyl cellosolve, butyl cellosolve, dimethylformamide, dimethyl sulfoxide, dioxane, cyclohexanone, tetrahydrofuran, acetone, methyl ethyl ketone, ethyl acetate, and diethyl ether. One of these solvents may be used alone, or two or more thereof may be used in combination.

Examples of the apparatus for performing the solution cast method (solution casting method) include a drum-type casting machine, a band-type casting machine and a spin coater.

Examples of the melt extrusion method include a T-die method and an inflation method. At this time, the film forming temperature is preferably from 150 to 350° C., more preferably from 200 to 300° C.

As for the stretching method in performing stretching, a conventionally known stretching method can be applied, and examples of the stretching method which can be used include uniaxial stretching, sequential biaxial stretching, and simultaneous biaxial stretching. The stretching is preferably performed in the vicinity of the glass transition temperature of the polymer as the raw material of the film. The specific stretching temperature is preferably from (glass transition temperature−30° C.) to (glass transition temperature+100° C.), more preferably from (glass transition temperature−20° C.) to (glass transition temperature+80° C.). By setting the stretching temperature to be (glass transition temperature−30° C.) or more, a sufficient stretch ratio tends to be obtained, and by setting the stretching temperature to be (glass transition temperature+100° C.) or less, stable stretching is liable to be easily performed due to flowing of the resin. The stretch ratio defined by the area ratio is preferably from 1.1 to 25 times, more preferably from 1.3 to 10 times. By setting the stretch ratio to be 1.1 times or more, enhancement of the toughness by stretching tends to be easily obtained, and by setting the stretch ratio to be 25 times or less, the effect by the increase in the stretch ratio is liable to be more clearly recognized.

The stretching rate (one direction) is preferably from 10 to 20,000%/min, more preferably from 100 to 10,000%/min. By setting the stretching rate to be 10%/min or more, the time necessary for obtaining a sufficient stretch ratio tends to become shorter and the production cost can be reduced, and by setting the stretching rate to be 20,000%/min or less, rupture or the like of the stretched film scarcely occurs. In order to stabilize the optical isotropy or mechanical property of the film, a heat treatment (annealing) or the like may also be performed after the stretching.

The thickness of the support for use in the present invention is preferably from 10 to 500 μm, more preferably from 20 to 300 μm. If the thickness is less than 10 μm, a uniform support can be hardly produced, whereas if it exceeds 500 μM, the surface film of a display becomes too thick and this may disadvantageously run against the trend of thinning and weight saving.

3. Hardcoat Layer-Forming Coating Composition

In order to impart a hardcoat property, the hardcoat laminate of the present invention has a hardcoat layer obtained by applying a hardcoat layer-forming coating composition containing the following components (a), (b) and (c) and containing substantially no organic solvent onto the support above, and, if desired, drying and curing the coating.

(a) A curable compound having three or more polymerizable groups within one molecule.

(b) A polymerization initiator.

(c) A diluent having from one to three polymerizable groups within one molecule.

The component (a), that is, the curable compound having three or more polymerizable groups within one molecule, is an important curable component in effectively creating a crosslinked structure in the coating film by a polymerization reaction. The component (c), that is, the diluent having from one to three polymerizable groups within one molecule, is used generally for controlling the viscosity at the coating and by virtue of using this component, removal of an organic solvent from the hardcoat layer-forming coating composition becomes possible. Also, the component (b) is a polymerization initiator necessary for curing the components (a) and (c).

The expression "containing substantially no organic solvent" means no addition of an organic solvent and indicates that a slight amount of an organic solvent mixed in due to use of the components (a) to (c) can be contained. Specifically, the content of the organic solvent is preferably 3 mass % or less based on the entire hardcoat layer-forming coating composition.

Preferred embodiments of each component are described below.

3-1. Component (a): a Curable Compound Having Three or More Polymerizable groups within one molecule The component (a) for use in the present invention is a polyfunctional monomer or polyfunctional oligomer having a trifunctional or greater polymerizable group and is a curable compound that undergoes crosslinking by the effect of heat, light, electron beam or radiation. The polymerizable group includes a cationic polymerizable group, a radical polymerizable group and the like, but a radical photopolymerizable group is most preferred. Examples of the photopolymerizable group include an unsaturated polymerizable group such as (meth)acryloyl group, vinyl group, styryl group and allyl group, with a (meth)acryloyl group being preferred.

Examples of the polyfunctional acrylate having three or more acryloyl groups within the molecule include a trimethylolpropane triacrylate, a trimethylolpropane trimethacrylate, an ethylene oxide-modified trimethylolpropane, a propylene oxide-modified trimethylolpropane, a tris(acryloxyethyl)isocyanurate, caprolactone-modified tris(acryloxyethyl)isocyanurate, a pentaerythritol triacrylate, a pentaerythritol tetraacrylate, a dipentaerythritol tetraacrylate, a dipentaerythritol pentaacrylate, a dipentaerythritol hexaacrylate, an alkyl-modified dipentaerythritol triacrylate, an alkyl-modified dipenta-erythritol tetraacrylate, an alkyl-modified dipentaerythritol pentaacrylate, a caprolactone-modified dipentaerythritol hexaacrylate, a carboxyl group-containing polyfunctional acrylate obtained by reacting a tetracarboxylic dianhydride and a hydroxyl group-containing polyfunctional acrylate having a hydroxyl group and three or more acryloyl groups within the molecule, and a mixture of two or more members thereof. Among these, preferred is a carboxyl group-containing polyfunctional acrylate obtained by reacting a tetracarboxylic dianhydride and a hydroxyl group-containing polyfunctional acrylate having a hydroxyl group and three or more acryloyl groups within the molecule.

Specific examples of the tetracarboxylic dianhydride include pyromellitic dianhydride, 3,3',4,4'-benzophenone tetracarboxylic dianhydride, 4,4''-biphthalic anhydride, 4,4'-oxodiphthalic anhydride, 4,4'-(hexafluoroisopropylidene) diphthalic anhydride, 1,2,3,4-cyclopentane tetracarboxylic dianhydride, 5-(2,5-dioxotetrahydrofuryl)-3-methyl-cyclohexene-1,2-dicarboxylic anhydride, 4-(2,5-dioxotetrahydrofuran-3-yl)-tetralin-1,2-dicarboxylic anhydride, 3,4,9,10-perylene tetracarboxylic dianhydride, and bicyclo[2.2.2]oct-7-ene-2,3,5,6-tetracarboxylic dianhydride.

Specific examples of the hydroxyl group-containing polyfunctional acrylate having a hydroxyl group and three or more acryloyl groups within the molecule include pentaerythritol triacrylate, dipentaerythritol tetraacrylate, dipentaerythritol pentaacrylate, and a mixture thereof. These are particularly preferred because the cured film thereof gives a coated layer excellent in the abrasion resistance.

Furthermore, trifunctional or greater epoxy(meth)acrylates, urethane (meth)acrylates, polyester (meth)acrylates, polyether (meth)acrylates, polybutadienes and the like described, for example, in Kiyomi Kato, *Shigaisen Koka System (Ultraviolet Curing System)*, Chap. 6, "Photopolymerizable Oligomer", Sogo Gijutsu Center K. K. (1989) may also be suitably used.

The curable compounds as the component (a) for use in the present invention may be used individually or in combination and assuming that the total amount of the hardcoat layer-forming coating composition is 100 parts by mass, the curable compound is suitably used in a range of 5 to 85 parts by mass, preferably from 10 to 60 parts by mass, more preferably from 15 to 50 parts by mass. If the proportion of the component (a) used is less than 10 parts by mass, a cured film having sufficient abrasion resistance can be hardly obtained, whereas if the amount thereof exceeds 90 parts by mass, great contraction occurs due to polymerization and this is disadvantageous in that stain is liable to remain in the cured film or flexibility of the film tends to decrease.

3-2. Component (b): a Polymerization Initiator

The polymerization initiator as the component (b) includes a photopolymerization initiator and a thermopolymerization initiator. In the presence of such a polymerization initiator, a hardcoat layer can be formed by the irradiation of ionizing radiation or under heating. The polymerization initiator used may be appropriately selected from many known radical polymerization initiators, cationic polymerization initiators, photoacid generators and the like according to the kind of the curable compound.

(Photopolymerization Initiator)

The photopolymerization initiator is preferably a radical photopolymerization initiator, and examples of the radical photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes, and coumarins.

Examples of the acetophenones include 2,2-dimethoxyacetophenone, 2,2-diethoxyacetophenone, p-dimethylacetophenone, 1-hydroxy-dimethyl phenyl ketone, 1-hydroxy-dimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone, 4-tert-butyl-dichloroacetophenone, 2-hydroxy-2-methyl-acetophenone (Darocure 1173, produced by Ciba Specialty Chemicals Corp.), and (p-hydroxyethoxy)-2-hydroxy-2-methyl-acetophenone (Irgacure 2959, produced by Ciba Specialty Chemicals Corp.).

Examples of the benzoins include benzoin, benzoin methyl ether, benzoin ethyl ether, benzoin isopropyl ether, benzyl dimethyl ketal, benzoin benzenesulfonic acid ester, benzoin toluenesulfonic acid ester, benzoin methyl ether, benzoin ethyl ether, and benzoin isopropyl ether.

Examples of the benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone (Michler's ketone) and 3,3',4,4'-tetra(tert-butylperoxycarbonyl)benzophenone.

Examples of the phosphine oxides include 2,4,6-trimethylbenzoyldiphenylphosphine oxide. Examples of the active esters include IRGACURE OXE01 (1,2-octanedione, 1-[4-(phenylthio)-2-(O-benzoyloxime)], produced by Ciba Specialty Chemicals Corp.), sulfonic acid esters and cyclic active ester compounds. Specifically, Compounds 1 to 21 described in Examples of JP-A-2000-80068 are preferred.

Examples of the onium salts include an aromatic diazonium salt, an aromatic iodonium salt and an aromatic sulfonium salt. Examples of the borate salts include ion complexes with a cationic coloring matter.

As for the active halogens, s-triazine and oxathiazole compounds are known, and examples thereof include 2-(p-methoxyphenyl)-4,6-bis(trichloromethyl)-s-triazine, 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate)amino)phenyl-4,6-bis(trichloromethyl)-s-triazine, and 2-trihalomethyl-5-(p-methoxyphenyl)-1,3,4-oxadiazole.

Specific preferred examples thereof include compounds described at pp. 14-30 of JP-A-58-15503 and pp. 6-10 of JP-A-55-77742, compound Nos. 1 to 8 described at page 287 of JP-B-60-27673 (the term "JP-B" as used herein means an "examined Japanese patent publication"), compound Nos. 1 to 17 described at pp. 443-444 of JP-A-60-239736, and compound Nos. 1 to 19 described in U.S. Pat. No. 4,701,399.

In the present invention, in order to improve the adherence between the hardcoat layer and the support, after applying the hardcoat layer-forming coating composition on a support, the coating is preferably well dried to remove the water content and then cured. At the removal of the water content, a polymerization initiator having a low molecular weight volatilizes or moves to be hardly present inside of the hardcoat layer-forming coating composition or is liable to remain on the surface of a resin phase dispersed in the coating composition, and high hardness is difficult to obtain after curing. For solving this problem, in the present invention, a polymerization initiator having a molecular weight of 220 or more, or an oligomer-type polymerization initiator is preferably used.

The oligomer-type polymerization initiator is preferably an oligomer-type radiation polymerization initiator having a site of generating a photoradical upon irradiation with radiation.

Also, in order to prevent volatilization during heat treatment, the molecular weight of the oligomer-type polymerization initiator is preferably from 250 to 10,000, more preferably from 300 to 10,000. By setting the mass average molecular weight to fall in this range, the polymerization initiator exhibits low volatility, and the cured coating film obtained can have sufficiently high hardness.

Out of the oligomer-type polymerization initiators, the bis-type α-hydroxy ketone-based photopolymerization initiator that is a compound effective for prevention of volatilization includes 2-hydroxy-1-{4-[4-(2-hydroxy-2-methyl-propionyl)-benzyl]-phenyl}-2-methyl-propan-1-one (Irgacure 127, produced by Ciba Specialty Chemicals Corp., molecular weight: 340).

Also, specific examples of the oligomer-type polymerization initiator include an oligomer-type ultraviolet polymerization initiator represented by the following formula (9):

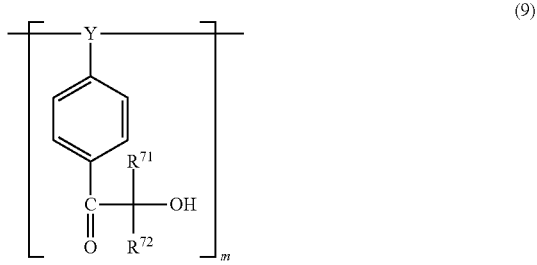

(9)

In formula (9), Y represents a linear or branched alkylene group, $R^{71}$ and $R^{72}$ each is a linear or branched alkyl group and may combine with each other to form a ring, and m represents an integer of 2 to 50.

The number of carbon atoms of the linear or branched alkylene group of Y is not particularly limited but is preferably from 1 to 10, more preferably from 1 to 6, still more preferably from 1 to 3. The number of carbon atoms of the linear or branched alkyl group of $R^{71}$ and $R^{72}$ is not particularly limited but is preferably from 1 to 8, more preferably from 1 to 5, still more preferably from 1 to 3. m is preferably an integer of 2 to 20, more preferably from 2 to 10, still more preferably from 2 to 6.

The terminal in the chain part of the repeating unit of the oligomer-type polymerization initiator is bonded to a substituent. The substituent may be a group derived from an oligomer polymerization initiator or a group derived from an oligomer polymerization terminator but is usually a hydrogen atom or a hydrocarbon group. Examples of the hydrocarbon group include an alkyl group, a cycloalkyl group and an aryl group. Examples of the alkyl group include a lower alkyl group such as methyl group, ethyl group, propyl group and butyl group. Examples of the cycloalkyl group include a cyclohexyl group, a cycloheptyl group, a cyclooctyl group, and an alkyl-substitution product thereof. Examples of the aryl group include a phenyl group and an alkyl-substitution product thereof.

Specific examples of the oligomer-type polymerization initiator include poly[2-hydroxy-2-methyl-1-{4-(1-methylvinyl)phenyl}propanone], poly[2-hydroxy-2-methyl-1-{4-vinyl-phenyl}propanone], poly[2-hydroxy-2-ethyl-1-{4-(1-methylvinyl)phenyl}propanone], poly[2-hydroxy-2-ethyl-1-{4-vinyl-phenyl}propanone], poly[2-hydroxy-2-methyl-1-{4-(1-methylvinyl)phenyl}butanone], poly[2-hydroxy-2-methyl-1-{4-vinyl-phenyl}butanone], poly[2-hydroxy-2-ethyl-1-{4-(1-methylvinyl)phenyl}butanone], and poly[2-hydroxy-2-ethyl-1-{4-vinyl-phenyl}butanone].

Examples of the commercial product as the polymerization initiator represented by formula (9) include "Esacure KIP150" (CAS-No. 163702-01-0), "Esacure KIP65LT" (a mixture of "Esacure KIP150" and tripropylene glycol diacrylate), "Esacure KIP100F" (a mixture of "Esacure KIP150" and 2-hydroxy-2-methyl-1-phenylpropan-1-one), "Esacure KT37", "Esacure KT55" (both are a mixture of "Esacure KIP150" and a methylbenzophenone derivative), "Esacure KT046" (a mixture of "Esacure KIP150", a methylbenzophenone derivative and 2,4,6-trimethylbenzoyldiphenyl phosphine oxide), and "Esacure KIP75/B" (a mixture of "Esacure KIP150" and 2,2-dimethoxy-1,2-diphenylethan-1-one), all trade names, produced by Fratelli Lamberti.

Also, the compounds described in *Saishin UV Koka Gijutsu* (*Latest UV Curing Technologies*), page 159, Technical Information Institute Co., Ltd. (1991), and Kiyomi Kato, *Shigaisen Koka System* (*Ultraviolet Curing System*), pp. 65-148, Sogo Gijutsu Center (1989), may be effectively used in the present invention.

Furthermore, preferred examples of the commercially available photo-cleavage type radical photopolymerization initiator include "Irgacure 127", "Irgacure 651", "Irgacure 184", "Irgacure 819", "Irgacure 907", "Irgacure 1870" (a 7/3 mixed initiator of CGI-403/Irg184), "Irgacure 500", "Irgacure 369", "Irgacure 1173", "Irgacure 2959", "Irgacure 4265", "Irgacure 4263" and "OXE01" produced by Ciba Specialty Chemicals Corp.; "KAYACURE DETX-S", "KAYACURE BP-100", "KAYACURE BDMK", "KAYACURE CTX", "KAYACURE BMS", "KAYACURE 2-EAQ", "KAYACURE ABQ", "KAYACURE CPTX", "KAYACURE EPD", "KAYACURE ITX", "KAYACURE QTX", "KAYACURE BTC" and "KAYACURE MCA" produced by Nippon Kayaku Co., Ltd.; "Esacure (KIP100F, KB1, EB3, BP, X33, KTO46, KT37, KIP150, TZT)" produced by Sartomer Company, Inc.; and a mixture thereof.

One of these photopolymerization initiators may be used alone, or two or more thereof may be used in combination. The proportion of the photopolymerization initiator used is preferably from 0.1 to 15 parts by mass, more preferably from 1 to 10 parts by mass, per 100 parts by mass of the component (a).

In addition to the photopolymerization initiator, a photosensitizer may be used. Specific examples of the photosensitizer include n-butylamine, triethylamine, tri-n-butylphosphine, Michler's ketone and thioxanthone. Furthermore, one or more auxiliary agents such as azide compound, thiourea compound and mercapto compound may be used in combination. Examples of the commercially available photosensitizer include "KAYACURE (DMBI, EPA)" produced by Nippon Kayaku Co., Ltd.

(Thermal Polymerization Initiator)

As for the thermal polymerization initiator, an organic or inorganic peroxide, an organic azo or diazo compound, or the like may be used.

Specifically, examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compound include 2,2'-azobis(isobutyronitrile), 2,2'-azobis(propionitrile) and 1,1'-azobis(cyclohexanecarbonitrile); and examples of the diazo compound include diazoaminobenzene and p-nitrobenzenediazonium.

One of these thermal polymerization initiators may be used alone, or two or more thereof may be used in combination. The proportion of the thermal polymerization initiator used is preferably from 0.1 to 15 parts by mass, more preferably from 1 to 10 parts by mass, per 100 parts by mass of the component (a).

3-3. Component (c): a Diluent Having from One to Three Polymerizable Groups within One Molecule In the present invention, the compound used as a diluent is a compound having from one to three polymerizable groups within one molecule and being compatible with the curable compound as the component (a) and the polymerization initiator as the compound (b), and this compound undertakes a role of decreasing the viscosity of the coating composition by the dilution effect. Also, since this diluent itself has from one to three polymerizable groups, its polymerization takes place in parallel to the polymerization of the compound (a) during the curing reaction and the compound is taken in as a part of the coating film. Accordingly, in comparison with the case of using an organic solvent as the diluent, the drying step can be advantageously omitted.

As for the compound having from one to three polymerizable groups within one molecule, which is effective as the diluent, a diluent that does not dissolve the support formed from a thermoplastic resin composition containing a polymer having a lactone ring unit or a glutaric anhydride unit, is useful. The diluent is preferably a compound having a viscosity at 25° C. of 10 mPa·s or less, more preferably 5 mPa·s or less.

In view of low viscosity and from the standpoint of decreasing the curling ascribable to volume contraction during polymerization, a compound having one or two polymerizable group(s) within one molecule is advantageous.

As for the preferred diluent, there may be used, for example, monofunctional to trifunctional acrylate monomers described in Kunihiro Ichimura (supervisor), *UV●EB Koka Gijutsu no Genjo to Tenbo* (*Current State And Prospect of UV●EB Curing Technology*), edited by RadTech Japan, pp. 12-18, CMC Shuppan (December, 2002), in other words, compounds having from one to three polymerizable groups within one molecule.

Examples of the compound having one polymerizable group within one molecule (monofunctional acrylate compound) include 2-ethylhexyl acrylate, lauryl acrylate, isooctyl acrylate, isostearyl acrylate, cyclohexyl acrylate, isophoronyl acrylate, benzyl acrylate, and 2-hydroxy-3-phenoxy acrylate.

Examples of the compound having two polymerizable groups within one molecule include 1,4-butane diacrylate, 1,6-hexane diacrylate, neopentyl diacrylate, and polyethylene glycol diacrylate.

Examples of the compound having three polymerizable groups within one molecule include PO-modified glycerin triacrylate and trimethylolpropane triacrylate.

The diluent for use in the present invention is not limited to the compounds exemplified above.

Out of these compounds, considering the low viscosity and the surface hardness and curling performance of the film, a compound having two polymerizable groups within one molecule is particularly useful.

In the present invention, other than the compounds described above as a diluent, the compounds set forth in the following formula group A may be used Structural Formula Group A:

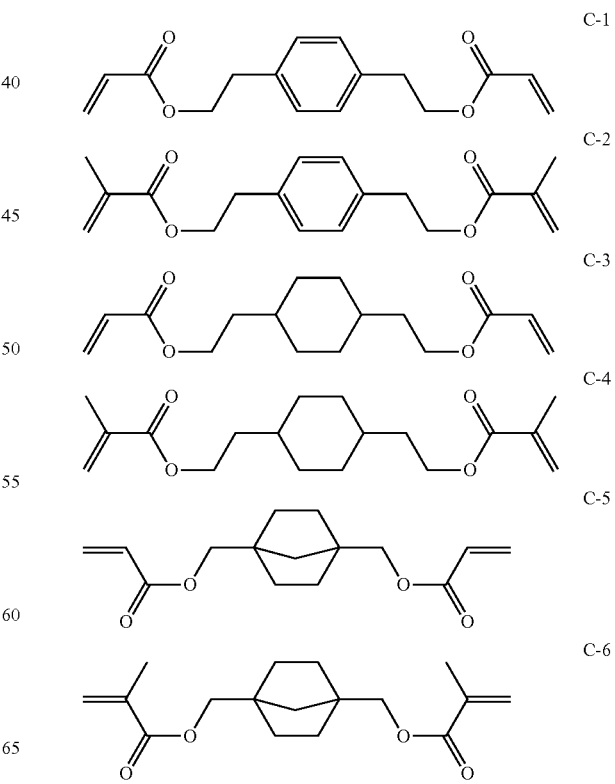

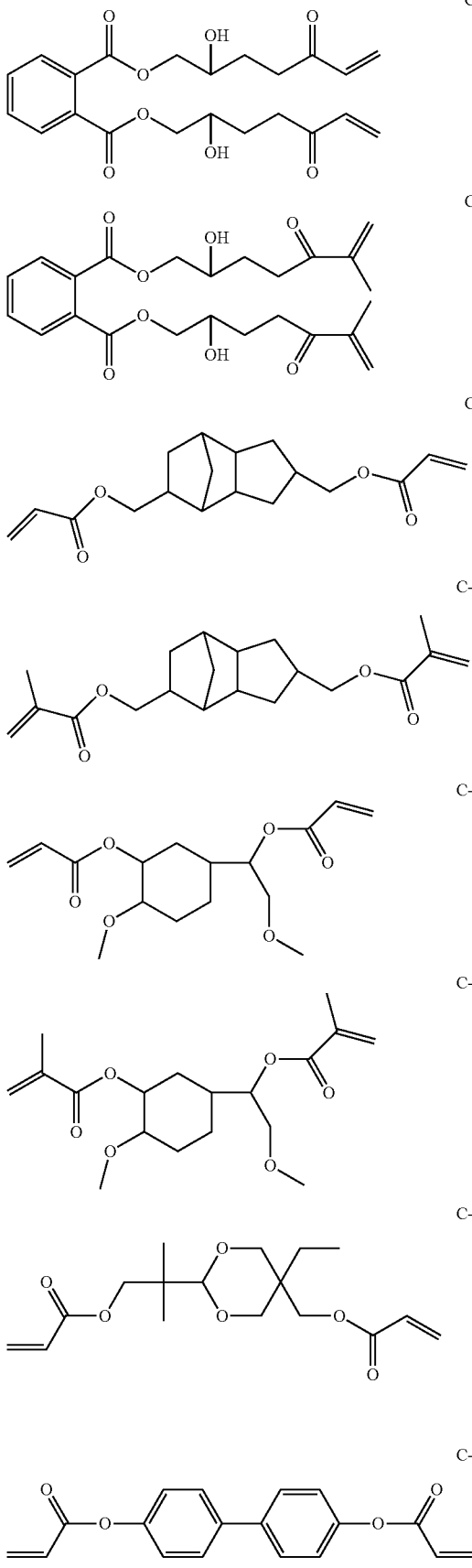
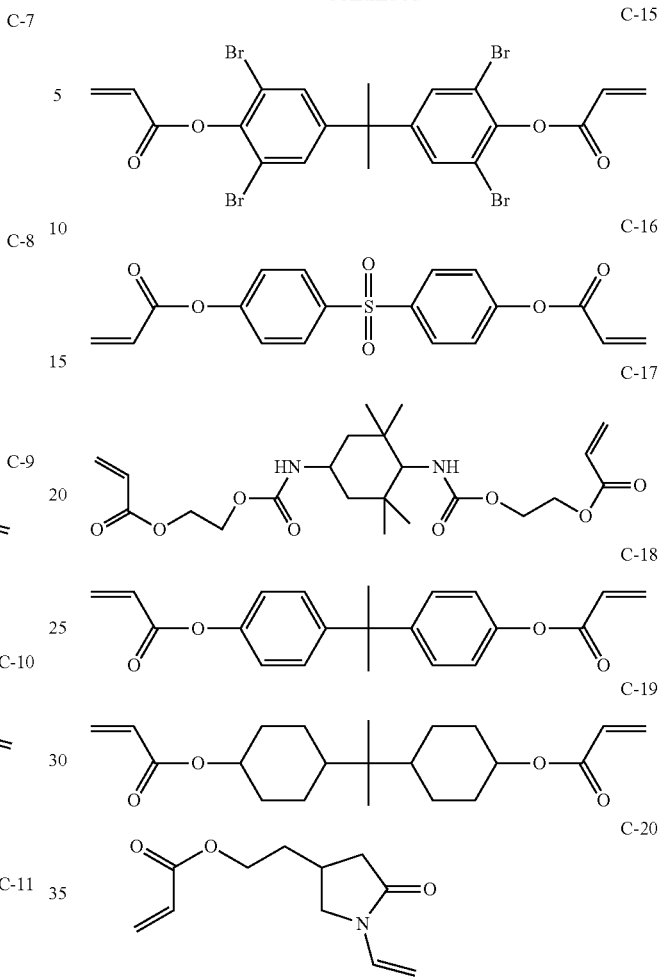

One of these compounds may be used alone, or two or more thereof may be used in combination, and the compound is preferably used in a range of 30 to 2,000 parts by mass, more preferably from 100 to 1,000 parts by mass, still more preferably from 200 to 800 parts by mass, per 100 parts by mass of the component (a).

The optimal viscosity of the hardcoat layer-forming coating composition for use in the present invention is governed mainly by the components (a) and (b), but usually, the viscosity at 25° C. is preferably adjusted to be from 1 to 500 mPa·s, more preferably from 2 to 100 mPa·s, and most preferably from 2 to 70 mPa·s.

3-4. Other Constituent Components

In the hardcoat layer-forming coating composition for use in the present invention, in addition to the component (a) (a curable compound having three or more polymerizable groups within one molecule), component (b) (a polymerization initiator) and component (c) (a diluent having from one to three polymerizable groups within one molecule), a hydrophilic solvent such as lower alcohol, a colorant and other additives such as leveling improver may be appropriately used in combination, if desired, within the range not deviating from the objects or effects of the present invention. Such an additive is preferably used in a range of 0.01 to 20 mass % based on the entire mass of the coating composition. In the present invention, the hardcoat layer-forming coating composition itself has good left-standing stability and scarcely dissolves the support and therefore, when wishing to employ the support for use in the present invention, adherence at the interface between the hardcoat layer and the support can be successfully maintained.

As regards the additive, for the purpose of imparting internal scattering property, a matting particle, for example, an inorganic compound particle or resin particle, having an average particle diameter of 1.0 to 15.0 μm, preferably from 1.5 to 10.0 μm, may be also contained.

Furthermore, as regards the additive, for the purpose of controlling the refractive index of the hardcoat layer, either one or both of a high refractive index monomer and an inorganic particle may be used. As well as the effect of controlling the refractive index, the inorganic particle provides an effect of suppressing the curing shrinkage due to a crosslinking reaction.

As regards the additive, an electrically conducting agent such as electrically conductive fine particle (e.g., ITO, ATO, PTO, GZO, AIZO, AZO), electrically conductive organic polymer, and quaternary salt of amine, may also be used. By the addition of an electrically conducting agent, the saturated charge amount on the outermost surface of the hardcoat laminate can be reduced and in turn, dust immunity resistance at the outermost surface can be imparted.

In view of imparting sufficient durability and impact resistance to the film, the thickness of the hardcoat layer is usually on the order of 0.5 to 50 μm, preferably from 1 to 20 μm, more preferably from 2 to 10 μm, and most preferably from 3 to 7 μm.

The surface hardness of the hardcoat layer is, in a pencil hardness test, preferably H or more, more preferably 2H or more, and most preferably 3H or more. Furthermore, in a Taber test according to JIS K5400, the wear volume of the test specimen between before and after the test is preferably smaller.

The haze of the hardcoat layer varies according to the function imparted to the optical film. In the case of maintaining the image sharpness and reducing the surface reflectance but not imparting a light-scattering function to the inside and surface of the hardcoat layer, the haze value is preferably lower and specifically, is preferably 10% or less, more preferably 5% or less, and most preferably 2% or less.

In the hardcoat laminate of the present invention, the surface haze and internal haze can be freely set according to the purpose but in the case of imparting an antiglare function by the surface scattering of the hardcoat layer, the surface haze is preferably from 5 to 15%, more preferably from 5 to 10%. Also, in the case of making less perceivable the pattern, color unevenness, brightness unevenness, glaring and the like on a liquid crystal panel by the effect of internal scattering in the hardcoat layer or imparting a function of enlarging the viewing angle by scattering, the internal haze (a value obtained by subtracting the surface haze value from the total haze value) is preferably from 10 to 90%, more preferably from 15 to 80%, and most preferably from 20 to 70%.

With respect to the surface irregularity shape of the hardcoat layer, in order to obtain a clear surface for the purpose of maintaining the image sharpness, out of characteristics indicative of the surface roughness, for example, the centerline average roughness (Ra) is preferably adjusted to 0.08 μm or less. Ra is more preferably 0.07 μm or less, still more preferably 0.06 μm or less. In the hardcoat laminate of the present invention, its surface irregularity is governed by the surface irregularity of the hardcoat layer, and the centerline average roughness of the hardcoat laminate can be made to fall in the above-described range by adjusting the centerline average roughness of the hardcoat layer.

For the purpose of maintaining the image sharpness, in addition to adjustment of the surface irregularity shape, it is preferred to adjust the transmitted image clarity. The transmitted image clarity of the clear hardcoat laminate is preferably 60% or more. The transmitted image clarity is indicative of the blurring degree of an image reflected by transmission through a film. As the value is larger, this indicates that the image viewed through the film is clearer and better. The transmitted image clarity is more preferably 70% or more, still more preferably 80% or more.

In the present invention, the hardcoat layer-forming coating composition preferably used for the support above includes a composition according to the following formulation:

Component (a):
trimethylolpropane triacrylate, pentaerythritol triacrylate, dipentaerythritol tetraacrylate, EO-added trimethylolpropane triacrylate, etc., 100 parts by mass, Component (b):
Irgacure 127, Esacure KIP150, trihalomethyl S-triazines, etc., from 1 to 5 parts by mass, Component (c):
neopentyl diacrylate, C-1, C-4, C-5, C-10 or C-18 of structural formula group A above, etc., from 100 to 500 parts by mass, and Additive:
$TiO_2$, $SnO_2$, $ZrO_2$, ITO, ATO, AZO, etc., from 1 to 10 parts by mass.

In the case of using a composition having this formulation, the properties above each is satisfied, particularly compatibility with the above-described support is good, ensuring no reduction in the transparency of the support. Moreover, the composition can be applied by various coating systems, and the hardcoat layer formed is excellent not only in the performance (surface hardness and curling property) but also in the adherence to the support.

4. Coating, Drying and Curing Methods of Hardcoat Layer 4-1. Coating Method of Hardcoat Layer In the present invention, the hardcoat layer may be formed by the following known coating methods, but the present invention is not limited thereto:

a dip coating method, an air knife coating method, a curtain coating method, a roller coating method, a wire bar coating method, a gravure coating method, an extrusion coating method (die coating method) (see, U.S. Pat. No. 2,681,294) and a microgravure coating method.

Among these, a microgravure coating method and a die coating method are preferred.

Above all, for supplying the hardcoat laminate of the present invention with high productivity, an extrusion method (die coating method) is preferably used. In particular, this method can be preferably used for a region having a small wet coated amount (20 $cm^3/m^2$ or less) as in the hardcoat layer or antireflection layer. Also, in the region where the viscosity of the hardcoat layer-forming coating composition for use in the present invention is from 10 to 100 mPa·s, this method is particularly preferred because the coated surface state is excellent as compared with other methods.

4-2. Drying Method of Hardcoat Layer

In the hardcoat laminate of the present invention, drying after coating the hardcoat layer-forming coating composition directly on the support is fundamentally not necessary because of no use of a solvent. However, when water, solvent or the like is mixed in together with impurities or other components and needs to be removed, a drying step of conveying the laminate in a web form through a heated drying zone is preferably performed.

The temperature of the drying zone is preferably from 25 to 140° C. Also, it is preferred that the first half of the drying zone is at a relatively low temperature and the latter half is at a relatively high temperature. However, the temperature is preferably lower than the temperature at which components (except for water) contained in the coating composition start volatilizing. For example, in some commercially available photoradical generators which are used in combination with an ultraviolet-curable resin, around several tens % is volatilized within several minutes in warm air at 120° C. Also, some monofunctional or bifunctional acrylate monomers or the like allow volatilization to proceed in warm air at 100° C. In such a case, the drying step is preferably performed at a temperature lower than the temperature causing the components (except for water) contained in the coating composition to start volatilizing.

For preventing drying unevenness, the drying air blown after the hardcoat layer-forming coating composition and the coating composition of each layer such as additionally formable constituent layer described later are coated on the support is preferably at a wind velocity of 0.1 to 2 m/sec on the coating film surface, within the range not causing wind unevenness (liquid flow by the wind) in the case of the hardcoat layer or while the solid content concentration of the coating composition is from 1 to 50 mass % in the case of the additional layer described later. Also, during passing through the drying zone after coating these coating compositions on the support, the difference in the temperature between the support and the conveying roll coming into contact with the support surface opposite the coated surface is preferably set to fall within the range of 0 to 20° C., because drying unevenness due to uneven heat transfer on the conveying roll can be prevented.

4-3. Curing Method of Hardcoat Layer

After performing, if desired, drying, the coating film is cured by passing the web through a curing zone for curing each coating film by the effect of ionizing radiation and/or heat, whereby the hardcoat laminate of the present invention can be obtained.

The ionizing radiation species which can be used here is not particularly limited and may be appropriately selected from an ultraviolet ray, an electron beam, a near ultraviolet ray, visible light, a near infrared ray, an infrared ray, an X-ray and the like according to the kind of the curable composition forming the film, but an ultraviolet ray and an electron beam are preferred, and an ultraviolet ray is more preferred because of simple handleability and easy availability of high energy.

The light source of an ultraviolet ray for photopolymerizing an ultraviolet reactive curable composition may be any light source as long it can emit an ultraviolet ray. Examples of the light source which can be used include a low-pressure mercury lamp, a medium-pressure mercury lamp, a high-pressure mercury lamp, an ultrahigh-pressure mercury lamp, a carbon arc lamp, a metal halide lamp and a xenon lamp. In addition, an ArF excimer laser, a KrF excimer laser, an excimer lamp, synchrotron radiation and the like may also be used. Among these, an ultrahigh-pressure mercury lamp, a high-pressure mercury lamp, a low-pressure mercury lamp, a carbon arc, a xenon arc and a metal halide lamp can be preferably used.

An electron beam can also be similarly used. Examples of the electron beam include an electron beam having an energy of generally from 50 to 1,000 keV, preferably from 100 to 300 keV, that is emitted from various electron beam accelerators such as Cockroft-Walton type, van de Graaff type, resonance transformation type, insulating core transformer type, linear type, dynamitron type and high frequency type.

The irradiation conditions vary depending on the lamp used, but the irradiation dose is preferably 10 mJ/cm$^2$ or more, more preferably from 50 to 10,000 mJ/cm$^2$, still more preferably from 50 to 2,000 mJ/cm$^2$. At this time, the irradiation dose distribution in the width direction of the web, including both ends, is preferably a distribution of 50 to 100%, more preferably a distribution of 80 to 100%, with respect to the maximum dose in the center.

In the present invention, at least one hardcoat layer stacked on the support is preferably cured by a process of irradiating ionizing radiation, where in the period of 0.5 seconds or more after starting the irradiation of ionizing radiation, the ionizing radiation is irradiated in an atmosphere having an oxygen concentration of 10 vol % or less in the state of the coating film being heated to a surface temperature of 60° C. or more. It is also preferred to heat the coating film in an atmosphere having an oxygen concentration of 3 vol % or less simultaneously and/or continuously with the irradiation of ionizing radiation. In particular, the low refractive index layer having a small thickness is preferably cured by this method. The curing reaction is accelerated by the heat, and a film excellent in the physical strength and chemical resistance can be formed.

The time for which ionizing radiation is irradiated is preferably from 0.7 to 60 seconds, more preferably from 0.7 to 10 seconds. By setting the irradiation time to be 0.7 seconds or more, the curing reaction can be completed to perform sufficient curing, and by setting it to be 60 seconds or less, the low oxygen condition need not be maintained for a long time and this is advantageous in that, for example, large-size equipment can be avoided or a large amount of inert gas is not necessary.

The crosslinking or polymerization reaction of the hardcoat layer-forming coating composition is preferably performed in an atmosphere having an oxygen concentration of 6 vol % or less, more preferably 4 vol % or less, still more preferably 2 vol % or less, and most preferably 1 vol % or less. Reduction of the oxygen concentration more than necessary requires using a large amount of an inert gas such as nitrogen, and this is not preferred in view of the production cost.

The means for reducing the oxygen concentration to be 10 vol % or less is preferably displacement of the air (nitrogen concentration: about 79 vol %, oxygen concentration: about 21 vol %) with another gas, more preferably displacement with nitrogen (nitrogen purging).

When the conditions are set such that an inert gas is supplied to the ionizing radiation irradiation chamber and at the same time, slightly blown out to the web inlet side of the irradiation chamber, not only the carry-over air associated with the web conveyance can be eliminated to effectively decrease the oxygen concentration in the reaction chamber but also the substantial oxygen concentration on an extreme surface that is greatly susceptible to curing inhibition by oxygen can be efficiently reduced. The direction to which the inert gas flows on the web inlet side of the irradiation chamber can be controlled by adjusting the balance between air supply and air discharge in the irradiation chamber. Blowing of an inert gas directly on the web surface is also preferred as the method for removing the carry-over air.

During curing, the film surface is preferably heated at 60 to 170° C. When the heating temperature is 60° C. or more, curing due to heating is allowed to proceed, and when it is 170° C. or less, a problem such as deformation of the support does not arise. The heating temperature is more preferably from 60 to 100° C. The "temperature of the film surface" indicates the surface temperature of a layer intended to be cured, such as hardcoat layer. The time from the initiation of UV irradiation until the film surface reaches such a temperature is preferably from 0.1 to 300 seconds, more preferably 10 seconds or less. When the time for which the film surface temperature is kept in the temperature range above is 0.1 second or more, the reaction of the curable composition forming a film can be accelerated, and when it is 300 seconds or less, decrease in the optical performance of the film or a problem in view of production, such as excessively large equipment, is not caused and this is preferred.

The heating method is not particularly limited but, for example, a method of contacting the film with a heated roll, a method of blowing heated nitrogen, or a method of irradiating far infrared ray or infrared ray is preferred. A method of performing heating by flowing a medium such as warm water or steam/oil in a rotating metal roll described in Japanese Patent 2,523,574 may also be used. As for the heating means, a dielectric heating roll or the like may also be used.

In the present invention, at least one hardcoat layer stacked on the support may be cured by irradiating ionizing radiation a plurality of times. In this case, at least two irradiations of ionizing radiation are preferably performed in continuous reaction chambers where the oxygen concentration does not exceed 3 vol %. By performing the irradiation of ionizing radiation a plurality of times in reaction chambers having the same low oxygen concentration, the reaction time necessary for curing can be effectively ensured. Particularly, in the case of elevating the production speed for high productivity, irradiation of ionizing radiation a plurality of times become necessary for ensuring an ionizing radiation energy required for the curing reaction.

In the case of providing two or more hardcoat layers or providing another additionally formable constituent layer on the hardcoat layer, when the curing percentage (100−residual functional group content) of a hardcoat layer on the support is less than 100% and when another layer is provided on the hardcoat layer and cured by means of ionizing radiation and/or heat, the curing percentage of the hardcoat layer (lower layer) after providing the another layer is preferably higher than that before providing the another layer (upper layer), because the adherence between the lower layer and the upper layer is improved.

5. Additionally Formable Constituent Layer

In the hardcoat laminate of the present invention, in addition to the hardcoat layer, a singularity or plurality of other functional layers may be further provided. In one preferred embodiment, on the hardcoat layer formed on the support, an antireflection film is stacked by taking into consideration the refractive index, film thickness, number of layers, order of layers and the like such that the refractive index decreases by the optical interference, whereby an antireflection film can be prepared.

The antireflection film generally has, as a simplest construction, a construction where only a low refractive index layer is provided on a substrate. In order to more reduce the reflectance, the antireflection layer is preferably constructed by combining a high refractive index layer having a refractive index higher than that of the support (and the hardcoat layer) and a low refractive index layer having a refractive index lower than that of the support (and the hardcoat layer). Examples of the construction include a two-layer construction of high refractive index layer/low refractive index layer from the support side, and a construction formed by stacking three layers differing in the refractive index in the order of a medium refractive index layer (a layer having a refractive index higher than that of the support or hardcoat layer but lower than that of the high refractive index layer)/a high refractive index layer/a low refractive index layer. A construction where a larger number of antireflection layers are stacked is also proposed. Above all, in view of durability, optical property, cost, productivity and the like, it is preferred to coat a medium refractive index layer/a high refractive index layer/a low refractive index layer in this order on a support having thereon a hardcoat layer. Examples of this construction include the constructions described in JP-A-8-122504, JP-A-8-110401, JP-A-10-300902, JP-A-2002-243906 and JP-A-2000-111706.

A layer obtained by imparting other functions to each layer may also be used. Examples thereof include an antifouling low refractive index layer and an antistatic high refractive index layer (see, for example, JP-A-10-206603 and JP-A-2002-243906).

Another preferred embodiment is an optical film where layers necessary for imparting hardcoat property, moisture-proof property, gas-barrier property, antiglare property, antifouling property and the like are provided without aggressively using optical interference. These layers may be formed by vapor deposition, atmospheric plasma, coating or the like. In view of productivity, such a layer is preferably formed by coating.

The hardcoat laminate of the present invention is not particularly limited in its usage but may be suitably used as a front plate on the image display surface of an image display device, particularly as a protective film for a polarizing plate used in a liquid crystal display device and the like or as a film for the front plate of an image display device used in a plasma display, an organic EL display and the like.

When a low refractive index is further stacked on the outermost surface of the hardcoat laminate, this is a laminate with reduced reflectivity and enhanced visibility and can be suitably used as a laminate for the front plate of an image display device. In the present invention, the low refractive index layer indicates a layer having a refractive index of 1.1 to less than 1.5, preferably from 1.1 to 1.45. The hardcoat laminate having a low refractive index layer is imparted with an antireflection effect. The thickness of the low refractive index layer is from 20 to 400 nm, preferably from 50 to 120 nm.

EXAMPLES

The present invention is described in greater detail below by referring to Examples. The materials, amounts used, ratios, treatment contents, treatment procedures and the like used in the following Examples can be appropriately changed or modified without departing from the purport of the present invention. Accordingly, the scope of the present invention is not limited to these specific examples. In the following, "parts" and "%" are in terms of the mass.

Hardcoat Laminate

Production Ring-Containing Polymer

Synthesis Example 1

Production of Lactone Ring-Containing Polymer Pellet (P-1))

Into a 30 L-volume reaction kettle equipped with a stirring unit, a temperature sensor, a condenser and a nitrogen inlet tube, 8,000 g of methyl methacrylate (MMA), 2,000 g of methyl 2-(hydroxymethyl)acrylate (MHMA), 10,000 g of 4-methyl-2-pentanone (methyl isobutyl ketone, MIBK) and 5 g of n-dodecyl mercaptan are charged. While flowing nitrogen thereto, the temperature is raised to 105° C. and when the system started refluxing, 5.0 g of tert-butylperoxyisopropyl carbonate ("Kayacarbon Bic-75" (trade name), produced by Kayaku Akzo Corp.) is added as an initiator and as the same time, a solution containing 10.0 g of tert-butylperoxyisopropyl carbonate and 230 g of MIBK is added dropwise over 2 hours, thereby effecting solution polymerization under reflex (from about 105 to 120° C.). Furthermore, ripening is performed over 4 hours.

To the obtained polymer solution, 30 g of a stearyl phosphate/distearyl phosphate mixture ("Phoslex A-18" (trade name), produced by Sakai Chemical Industry Co., Ltd.) is added, and a cyclizing condensation reaction is performed under reflex (from about 90 to 120° C.) for 5 hours. The polymer solution obtained by the cyclizing condensation reaction is introduced at a treatment rate of 2.0 kg/hour in terms of the amount of resin into a vent-type twin-screw extruder ($\phi$=29.75 mm, L/D=30) where the barrel temperature is 260° C., the rotation number is 100 rpm, the pressure reduction degree is from 13.3 to 400 hPa (from 10 to 300 mmHg), the number of rear vents is 1, and the number of fore vents is 4. After performing the cyclizing condensation reaction and devolatilization in the extruder, the resultant product is extruded to obtain transparent Pellet (P-1).

The obtained Pellet (P-1) is subjected to dynamic TG measurement, as a result, a mass decrease of 0.17 mass % is detected. The dealcoholation reaction rate calculated from this mass decrease is 96.6%. The mass average molecular weight of the pellet is 133,000, the melt flow rate is 6.5 g/10 min, and the glass transition temperature is 131° C.

Synthesis Example 2

Production of Glutaric Anhydride Unit-Containing Acrylic Thermoplastic Copolymer Pellet (P-2))

20 Parts by mass of methyl methacrylate, 80 parts by mass of acrylamide, 0.3 parts by mass of potassium persulfate and 1,500 parts by mass of ion exchanged water are charged into a reaction vessel, and the system is kept at 70° C. while displacing the inside of the reaction vessel with a nitrogen gas until the monomers are completely converted into a polymer, whereby an aqueous methyl methacrylate/acrylamide copolymer-based suspension agent solution is produced.

A solution obtained by further dissolving 0.05 parts of the obtained aqueous methyl methacrylate/acrylamide copolymer-based suspension agent solution in 165 parts of ion exchanged water is fed to a stainless steel-made autoclave and stirred, and the inside of the system is displaced with a nitrogen gas. Thereafter, the following monomer mixture is added while stirring the reaction system, and the temperature is raised to 70° C.

| | |
|---|---|
| Methacrylic acid (MAA) | 30 parts by mass |
| Methyl methacrylate (MMA) | 70 parts by mass |
| tert-Dodecyl mercaptan | 0.6 parts by mass |
| 2,2'-Azobisisobutyronitrile | 0.4 parts by mass |

By assigning the polymerization initiating time to a point where the inner temperature reached 70° C., the system is kept for 180 minutes and then the polymerization is terminated. Subsequently, cooling of the reaction system and separation, washing and drying of the polymer are performed according to a normal method to produce bead-like Copolymer D. The polymerization percentage in the production of Copolymer D is 98%.

Bead-like Copolymer D and sodium methoxide are fed in a ratio of 100 parts by mass of Copolymer D and 0.5 parts by mass of sodium methoxide to a co-rotating twin-screw extruder with vents through the hopper port and melt-extruded at a resin temperature of 250° C. to produce Glutaric Anhydride Unit-Containing Acrylic Thermoplastic Copolymer (P-2). The obtained acrylic thermoplastic copolymer is analyzed by an infrared spectrophotometer, as a result, an absorption peak is confirmed at 1,800 cm$^{-1}$ and 1,760 cm$^{-1}$, revealing that a glutaric anhydride unit is formed. Also, this acrylic thermoplastic copolymer is dissolved in heavy dimethylsulfoxide and when the copolymer composition is determined by $^1$H-NMR measurement at room temperature (23° C.), the methyl acrylate unit is 70 mass %, the glutaric anhydride unit is 30 mass %, and the methacrylic acid unit is 0 mass %. The glass transition temperature is 145° C.

Production of Transparent Support

Production Example 1

Production of Support (SP-1)

Pellet (P-1) and an acrylonitrile-styrene (AS) resin (TOYO AS AS20" (trade name), produced by Toyo Styrene Co., Ltd.) are kneaded using a single-screw extruder ($\phi$=30 mm) in a mass ratio of P-1/AS resin=90/10 to obtain a transparent pellet. The glass transition temperature of the obtained pellet is 127° C. This pellet is dissolved in methyl ethyl ketone (MEK), and Film (SP-1) of 60 μm is produced by a solution casting method.

Production Example 2

Production of Support (SP-2)

The film of Support (SP-1) obtained in Production Example 1 is uniaxially stretched to 1.5 times at 100° C. at a rate of 0.1 m/min to obtain Stretched Film (SP-2) of 50 μm.

Production Example 3

Production of Support (SP-3)

Pellet (P-2) obtained in Synthesis Example 2 is dissolved in MEK, and Film (SP-3) of 60 μM is produced by a solution casting method.

Preparation of Hardcoat Layer-Forming Coating Composition

Blending Example 1

Preparation of Hardcoat Layer-Forming Coating Composition (HCL-1)

8 Parts by mass of pentaerythritol triacrylate, 0.5 parts by mass of Irgacure 127 (produced by Nippon Ciba-Geigy K. K.) and 4 parts by mass of 2-ethylhexyl acrylate are mixed to prepare Hardcoat Layer-Forming Coating Composition (HCL-1).

Blending Example 2

Preparation of Hardcoat Layer-Forming Coating Composition (HCL-2)

Hardcoat Layer-Forming Coating Composition (HCL-2) is prepared in the same manner as in Blending Example 1 except that in Blending Example 1, 4 parts by mass of a bifunctional acryl compound shown by formula C-3 is used in place of 4 parts by mass of 2-ethylhexyl acrylate.

Blending Example 3

Preparation of Hardcoat Layer-Forming Coating Composition (HCL-3)

8 Parts by mass of KAYARAD DPCA-20 (partially caprolactone-modified dipentaerythritol hexaacrylate, produced by Nippon Kayaku Co., Ltd.), 0.5 parts by mass of Irgacure 907 (produced by Nippon Ciba-Geigy K. K.), 0.2 parts by mass of 2-ethylthioxanthone and 8 parts by mass of a bifunctional acryl compound shown by formula C-18 are mixed to prepare Hardcoat Layer-Forming Coating Composition (HCL-3).

Blending Example 4

Preparation of Hardcoat Layer-Forming Coating Composition (HCL-4)

8 Parts by mass of dipentaerythritol hexaacrylate, 0.7 parts by mass of Irgacure 184 (produced by Nippon Ciba-Geigy K. K.), 5 parts by mass of isophoronyl acrylate and 5 parts by mass of neopentyl diacrylate are mixed to prepare Hardcoat Layer-Forming Coating Composition (HCL-4).

Blending Example 5

Preparation of Hardcoat Layer-Forming Coating Composition (HCL-5)

8 Parts by mass of EO-added (n=2) trimethylolpropane triacrylate, 0.5 parts by mass of Irgacure 127 (produced by Nippon Ciba-Geigy K. K.) and 8 parts by mass of a compound represented by formula C-10 are mixed to prepare Hardcoat Layer-Forming Coating Composition (HCL-5).

Blending Example 6

Preparation of Hardcoat Layer-Forming Coating Composition (HCL-6)

5 Parts by mass of dipentaerythritol tetraacrylate, 0.5 parts by mass of Esacure KIP150 (produced by Fratelli Lamberti) and 15 parts by mass of C-10 are mixed to prepare Hardcoat Layer-Forming Coating Composition (HCL-6).

Blending Example 7

Preparation of Hardcoat Layer-Forming Coating Composition (HCL-7) (for Comparison)

8 Parts by mass of dipentaerythritol hexaacrylate, 2 parts by mass of 1,4-butane diacrylate, 0.5 parts by mass of Irgacure 907 (produced by Nippon Ciba-Geigy K. K.) and 35 parts by mass of methyl ethyl ketone are mixed to prepare Hardcoat Layer-Forming Coating Composition (HCL-7).

Blending Example 8

Preparation of Hardcoat Layer-Forming Coating Composition (HCL-8) (for Comparison)

0.7 Parts by mass of Irgacure 127 (produced by Nippon Ciba-Geigy K. K.) is dissolved in 10 parts by mass of trimethylolpropane triacrylate to prepare Hardcoat Layer-Forming Coating Composition (HCL-8).

Production of Hardcoat Laminate

Example 1

Production of Hardcoat Laminate (HC-1))

On Support (SP-1) produced above, Hardcoat Layer-Forming Coating Solution (HCL-1) is coated by a die coating method and dried at 80° C. for 5 minutes, and the coated layer is cured by irradiating an ultraviolet ray at an irradiation dose of 300 mJ/cm$^2$ with use of "Air-Cooled Metal Halide Lamp" (manufactured by Eye Graphics Co., Ltd.) of 240 W/cm under nitrogen purging to form a hardcoat layer of 10 µm in dry thickness.

Examples 2 to 14 and Comparative Examples 1 to 6

Production of Hardcoat Laminates (HC-2 to HC-20))

Hardcoat Laminates (HC-2 to HC-20) are produced in the same manner as in Example 1 except that in Example 1, the support and hardcoat layer-forming coating solution are changed as shown in Table 1.
(Evaluation of Hardcoat Laminate)
Hardcoat Laminates (HC-1) to (HC-20) produced are subjected the following evaluations.
(Evaluation 1: Evaluation of Pencil Hardness)
The hardness of the hardcoat laminate is evaluated by a pencil hardness test according to JIS K-5400. The pencil hardness of the support alone is of an HB level in all of SP-1, SP-2 and SP-3.
(Evaluation 2: Evaluation of Curling)
A film strip of 2 mm×30 mm is produced with the longitudinal being the direction perpendicular to the laminate coating direction of the hardcoat laminate. After leaving it to stand in the evaluation environmental conditions of 25° C. and 60% RH for 1 day, the film strip is placed on a smooth plate with the stacked side down and the height in the highest portion of the curl arc is measured by a reading microscope. The curl is 0 mm in all of SP-1, SP-2 and SP-3, and the laminate is curled in a recessed shape on the stacked side. The values are shown in Table 1. A larger value indicates a stronger curl, and 0.8 mm or less is a region of causing no problem in practice.
(Evaluation 3: Evaluation of Adherence (Normal Humidity Condition))
The adherence between the transparent support and the hardcoat layer is evaluated by the following method.
The hardcoat laminate surface having the hardcoat layer is incised at intervals of 1 mm with a cutter knife in a grid pattern of 11 by 11 lines to form 100 squares in total. After the hardcoat laminate is left standing under the conditions of 25° C. and 55% RH for 24 hours, a test of press-contacting a polyester adhesive tape (NO. 31B) produced by Nitto Denko Corp. in a room conditioned to a temperature of 25° C. and a humidity of 60% RH, leaving it to stand for 15 minutes, and then peeling off the tape is repeated three times on the same portion, and the presence or absence of separation is observed with an eye. The number of squares separated out of 100 squares is counted. The number of squares separated is preferably 5 or less, more preferably 2 or less.
(Evaluation 4: Transparency of Coating Film)
The transparency (occurrence or no occurrence of white turbidity) of the hardcoat laminate is evaluated by the change in haze between before and after coating of the hardcoat layer. The haze indicates a haze value specified in JIS K-7105, and after measuring the laminate with a turbidity meter, "NDH-1001DP", manufactured by Nippon Denshoku Industries Co., Ltd. based on the measuring method specified in JIS K-7361-1, a value determined by automatic meter reading as haze=(diffused light/entire transmitted light)×100(%) is used. A haze difference exceeding 1 is a level of allowing easy visibility of white turbidity and is not preferred. The evaluation results are shown in the Table 1.

TABLE 1

| | | Hardcoat Laminate | | | | | |
|---|---|---|---|---|---|---|---|
| | Construction | | Evaluation Results of Physical Properties | | | | |
| Sample No. | Support | Hardcoat Layer-Forming Coating Composition | Pencil Hardness | Curl (mm) | Adherence | Transparency (haze) | |
| HC-1 | SP-1 | HCL-1 | 3H | 0.3 | 1 | 0.3 | Invention |
| HC-2 | SP-1 | HCL-2 | 3H | 0.2 | 0 | 0.3 | Invention |
| HC-3 | SP-1 | HCL-3 | 4H | 0.2 | 0 | 0.3 | Invention |
| HC-4 | SP-1 | HCL-4 | 3H | 0.1 | 1 | 0.3 | Invention |
| HC-5 | SP-1 | HCL-5 | 4H | 0.1 | 0 | 0.2 | Invention |
| HC-6 | SP-1 | HCL-6 | 4H | 0.1 | 0 | 0.2 | Invention |
| HC-7 | SP-1 | HCL-7 | 3H | 0.8 | 13 | 3.6 | Comparative Example |
| HC-8 | SP-1 | HCL-8 | 3H | 2.5 | 2 | 0.3 | Comparative Example |
| HC-9 | SP-2 | HCL-1 | 3H | 0.3 | 0 | 0.3 | Invention |
| HC-10 | SP-2 | HCL-2 | 3H | 0.4 | 0 | 0.3 | Invention |
| HC-11 | SP-2 | HCL-3 | 3H | 0.3 | 0 | 0.3 | Invention |
| HC-12 | SP-2 | HCL-4 | 4H | 0.2 | 1 | 0.3 | Invention |
| HC-13 | SP-2 | HCL-7 | 3H | 0.6 | 14 | 4.2 | Comparative Example |
| HC-14 | SP-2 | HCL-8 | 4H | 2.3 | 1 | 0.4 | Comparative Example |
| HC-15 | SP-3 | HCL-1 | 3H | 0.4 | 2 | 0.3 | Invention |
| HC-16 | SP-3 | HCL-2 | 4H | 0.2 | 1 | 0.3 | Invention |
| HC-17 | SP-3 | HCL-3 | 3H | 0.3 | 1 | 0.3 | Invention |
| HC-18 | SP-3 | HCL-4 | 3H | 0.2 | 0 | 0.3 | Invention |
| HC-19 | SP-3 | HCL-7 | 4H | 0.5 | 12 | 3 | Comparative Example |
| HC-20 | SP-3 | HCL-8 | 3H | 1.9 | 2 | 0.3 | Comparative Example |

As seen from Table 1, the samples of the present invention produced by coating a hardcoat layer-forming composition containing (a) a curable compound having three or more polymerizable groups within one molecule, (b) a polymerization initiator, and (c) a diluent having from one to three polymerizable groups within one molecule are reduced in the generation of haze and excellent in the pencil hardness, curling property and adherence.

On the other hand, in the sample where Hardcoat Layer Coating Composition (HCL-7) obtained by dilution with an organic solvent is coated, increase of haze is recognized and the adherence is also poor. Furthermore, it is apparent that the samples using Hardcoat Layer (HCL-8) not containing the component (c) suffer from a problem of seriously large curl.

According to the present invention, a hardcoat laminate having formed therein a hardcoat layer ensuring high transparency (being resistant to whitening) and satisfying both surface hardness and curling property can be provided.

In the present invention, an organic solvent employed for the purpose of controlling the viscosity at the coating is not used in the hardcoat layer-forming coating composition, so that a laminate with excellent transparency can be formed also for a support that is formed from a thermoplastic resin composition containing a polymer having a lactone ring unit or a glutaric acid unit and is poor in the organic solvent resistance, without allowing the support surface to dissolve and losing the transparency. Also, a polymerizable compound with low viscosity is used in combination as a diluent, so that a hardcoat laminate easy to control the surface hardness and curling property and assured of high surface hardness and small curling can be provided. Furthermore, by the use of a hardcoat layer-forming coating composition using the components (a) to (c) in combination, an effect of facilitating the adjustment to a viscosity capable of responding to various coating systems can be obtained.

What is claimed is:

1. A method for producing an optical film, comprising:
  applying a hardcoat layer forming coating composition onto a film support formed from a thermoplastic resin composition by a method selected from the group consisting of a dip coating method, air knife coating method, a curtain coating method, a roller coating method, a wire bar coating method, a gravure coating method, an extrusion coating method and a microgravure coating method; and
  curing the applied coating composition by transferring the film support, onto which the coating composition is applied, to pass through a curing zone at which the applied coating composition is cured by ionization radiation to form a hardcoat layer,
  wherein the thermoplastic resin composition contains a polymer having a lactone ring unit or a glutaric anhydride unit, and
  the hardcoat layer forming coating composition contains at least the following components (a), (b) and (c) and contains substantially no organic solvent, in which the hardcoat layer forming coating composition contains the component (c) in an amount of from 30 to 2,000 parts by mass per 100 parts by mass of the component (a):
  (a) a curable compound having three or more (meth)acryloyl groups within one molecule,
  (b) a polymerization initiator, and (c) a diluent having two (meth)acryloyl groups within one molecule.

2. The method according to claim 1, wherein a haze value of the hardcoat layer is 2% or less.

3. The method according to claim 1, wherein the film support has a thickness of from 10 to 500 μm.

4. The method according to claim 1, wherein the hardcoat layer forming coating composition contains the component (c) in an amount of from 100 to 1,000 parts by mass per 100 parts by mass of the component (a).

5. The method according to claim 1, wherein the hardcoat layer forming coating composition contains the component (c) in an amount of from 200 to 800 parts by mass per 100 parts by mass of the component (a).

6. The method according to claim 1, wherein the component (c) is a diluent represented by one of the formulae C-1 to C-20:

C-1
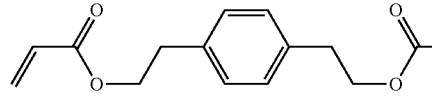

C-2
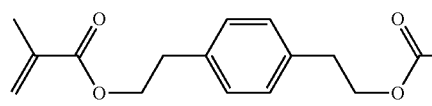

C-3
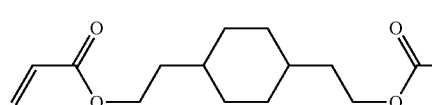

C-4
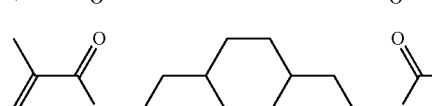

C-5
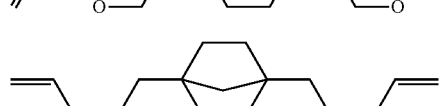

C-6
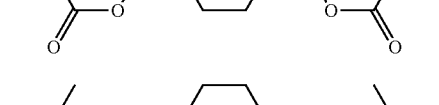

C-7
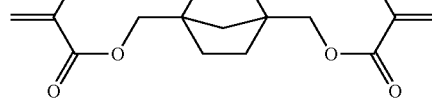

C-8
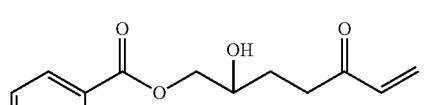

C-9
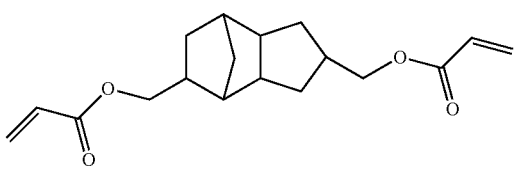

C-10
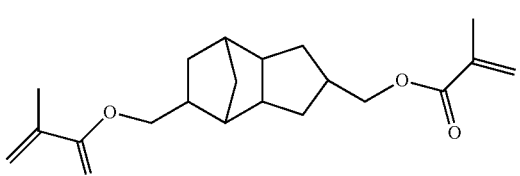

C-11
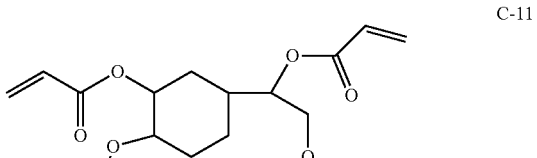

C-12
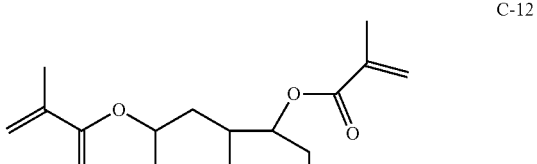

C-13
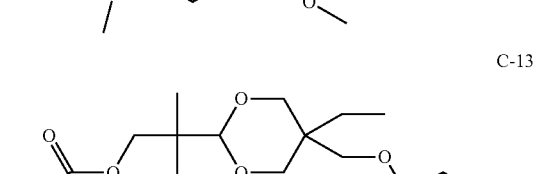

C-14
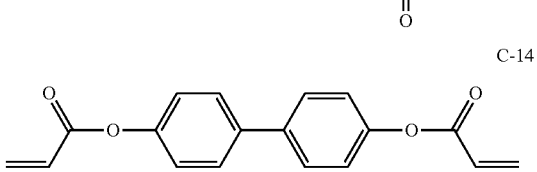

C-15
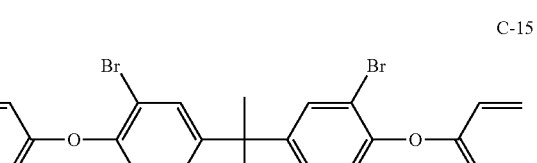

C-16
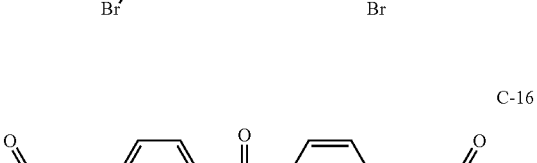

-continued

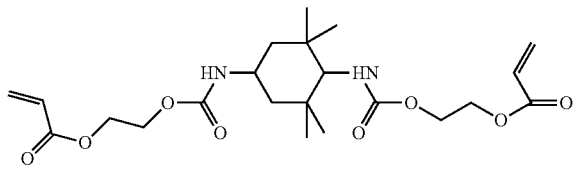
C-17

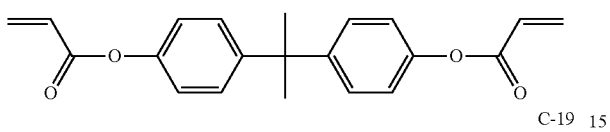
C-18

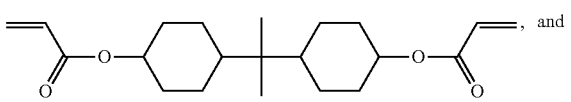
C-19
, and

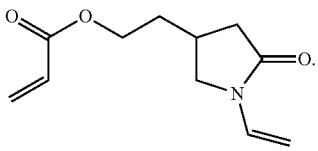
C-20

7. The method according to claim 1, wherein the polymer having a lactone ring unit has a unit represented by the following formula (1):

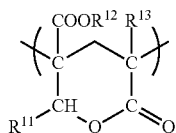
(1)

wherein $R^{11}$, $R^{12}$ and $R^{13}$ each independently represents a hydrogen atom or an organic residue having 1 to 20 carbon atoms, and the organic residue may contain an oxygen atom.

8. The method according to claim 1, wherein the polymer having a glutaric anhydride unit has a unit represented by the following formula (3):

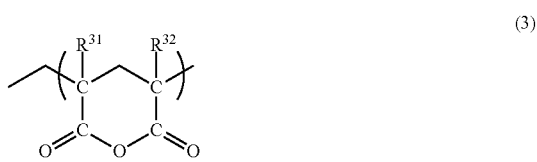
(3)

wherein $R^{31}$ and $R^{32}$ each independently represents a hydrogen atom or an organic residue having 1 to 20 carbon atoms, and the organic residue may contain an oxygen atom.

9. The method according to claim 1, wherein the thermoplastic resin composition further contains a copolymer having a vinyl cyanide-based monomer unit and an aromatic vinyl-based monomer unit.

10. An optical film, which is produced by the method according to claim 1.

11. A protective film for a polarizing plate, which comprises an optical film produced by the method according to claim 1.

12. A front plate of an image display device, which comprises an optical film produced by the method according to claim 1.

* * * * *